(12) United States Patent
Matsushita et al.

(10) Patent No.: US 8,345,118 B2
(45) Date of Patent: *Jan. 1, 2013

(54) IMAGE CAPTURING APPARATUS, IMAGE CAPTURING METHOD, ALBUM CREATING APPARATUS, ALBUM CREATING METHOD, ALBUM CREATING SYSTEM AND COMPUTER READABLE MEDIUM

(75) Inventors: Masahiro Matsushita, Kanagawa (JP); Kenji Kojima, Tokyo (JP); Hajime Shirasaka, Kanagawa (JP); Yasuhiko Kaneko, Kanagawa (JP); Ayumu Isomura, Tokyo (JP); Kimiko Tachikawa, Tokyo (JP); Shinsuke Zetsu, Tokyo (JP); Hideaki Yoshihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 12/968,057

(22) Filed: Dec. 14, 2010

(65) Prior Publication Data

US 2011/0085055 A1    Apr. 14, 2011

Related U.S. Application Data

(63) Continuation of application No. 11/898,633, filed on Sep. 13, 2007, now Pat. No. 7,868,924, which is a continuation of application No. PCT/JP2006/305318, filed on Mar. 13, 2006.

(30) Foreign Application Priority Data

Mar. 16, 2005   (JP) ................................ 2005-074288
Jan. 30, 2006   (JP) ................................ 2006-021533

(51) Int. Cl.
 *H04N 5/228* (2006.01)
(52) U.S. Cl. .................................. 348/222.1; 348/231.3
(58) Field of Classification Search ............... 348/222.1, 348/231.2, 231.3, 333.02
See application file for complete search history.

(56) References Cited

U.S. PATENT DOCUMENTS

| 7,477,805 | B2 | 1/2009 | Ohtsuka et al. |
| 2001/0043727 | A1 | 11/2001 | Cooper |
| 2002/0001468 | A1 | 1/2002 | Kaku |
| 2002/0008622 | A1 | 1/2002 | Weston et al. |
| 2002/0103813 | A1 | 8/2002 | Frigon |

(Continued)

FOREIGN PATENT DOCUMENTS

EP    1 260 934 A2    11/2002

(Continued)

*Primary Examiner* — Gevell Selby
(74) *Attorney, Agent, or Firm* — Birch, Stewart, Kolasch & Birch, LLP

(57) ABSTRACT

An image capturing apparatus includes: an image capturing section for capturing an image; a person determining section for determining whether the image captured by the image capturing section includes any person; an input notification section for notifying a user that the person included in the image captured by the image capturing section should be inputted when the image determining section determines that the image includes the person; a personal identification information input section for causing the user to input personal identification information indicative of the person included in the image captured by the image capturing section by a predetermined timing after the input notification section notifies the user that the person included in the image captured by the image capturing section should be inputted; and an image storage section for storing the personal identification information inputted by the personal identification information input section in association with the image captured by the image capturing section when the personal identification information input section inputs the personal identification information.

16 Claims, 18 Drawing Sheets

U.S. PATENT DOCUMENTS

| | | |
|---|---|---|
| 2003/0051207 A1* | 3/2003 | Kobayashi et al. ........... 715/500 |
| 2004/0039447 A1 | 2/2004 | Simon et al. |
| 2004/0109587 A1 | 6/2004 | Segawa et al. |
| 2004/0135904 A1 | 7/2004 | Shiota et al. |
| 2004/0213553 A1 | 10/2004 | Nagahashi |
| 2004/0264810 A1* | 12/2004 | Taugher et al. ............ 348/231.2 |
| 2006/0055826 A1 | 3/2006 | Zimmermann et al. |

FOREIGN PATENT DOCUMENTS

| | | |
|---|---|---|
| EP | 1 443 428 A2 | 8/2004 |
| JP | 10-126731 A | 5/1998 |
| JP | 2004-127285 A | 4/2004 |
| JP | 2004-213129 A | 7/2004 |
| JP | 2004-234228 A | 8/2004 |
| JP | 2004-282769 A | 10/2004 |

* cited by examiner

204

| IMAGE DATA | PERSONAL IDENTIFICATION INFORMATION | POSITION | PERSONAL IDENTIFICATION INFORMATION | POSITION | ... |
|---|---|---|---|---|---|
| IMAGE DATA 301 | PERSONAL IDENTIFICATION INFORMATION A | POSITION A | PERSONAL IDENTIFICATION INFORMATION B | POSITION B | ... |
| IMAGE DATA 302 | PERSONAL IDENTIFICATION INFORMATION C | POSITION C | PERSONAL IDENTIFICATION INFORMATION A | POSITION A' | ... |
| ⋮ | ⋮ | ⋮ | ⋮ | ⋮ | ⋮ |

| PERSONAL IDENTIFICATION INFORMATION | PERSONAL IDENTIFICATION INFORMATION ON RELATED PERSON | | | |
|---|---|---|---|---|
| PERSONAL IDENTIFICATION INFORMATION A | PERSONAL IDENTIFICATION INFORMATION B | PERSONAL IDENTIFICATION INFORMATION C | ... |
| PERSONAL IDENTIFICATION INFORMATION B | PERSONAL IDENTIFICATION INFORMATION A | — | ... |
| ⋮ | ⋮ | ⋮ | ⋮ |

*FIG. 4*

| PERSON GROUP IDENTIFICATION INFORMATION | PERSONAL IDENTIFICATION INFORMATION | | |
|---|---|---|---|
| PERSON GROUP IDENTIFICATION INFORMATION D | PERSON GROUP IDENTIFICATION INFORMATION A | PERSON GROUP IDENTIFICATION INFORMATION B | ... |
| PERSON GROUP IDENTIFICATION INFORMATION E | PERSON GROUP IDENTIFICATION INFORMATION B | PERSON GROUP IDENTIFICATION INFORMATION C | ... |
| ⋮ | ⋮ | ⋮ | ⋮ |

*FIG. 6*

```
Name         : Nana
File         : DSC0011.jpg
Position     : Left
Casting      : Hero
Date of Birth : 2001.11.15
```
~1102

```
Name         : ———
File         : DSC0011.jpg
Position     : Right
Casting      : Brother
Date of Birth : ———
```
~1104

```
Name         : ———
File         : DSC0021.jpg
Position     : Center
Casting      : Friend
Date of Birth : ———
```
~1106

FIG. 11

| PERSONAL IDENTIFICATION INFORMATION | PERSONAL IDENTIFICATION INFORMATION ON RELATED PERSON | | | |
|---|---|---|---|---|
| | PERSONAL IDENTIFICATION INFORMATION A | PERSONAL IDENTIFICATION INFORMATION B | PERSONAL IDENTIFICATION INFORMATION C | ...... |
| PERSONAL IDENTIFICATION INFORMATION A | | Friend  3 | — | ...... |
| PERSONAL IDENTIFICATION INFORMATION B | Hero | Hero  3 | — | ...... |
| | Brother | Brother  10 | — | ...... |
| ...... | ...... | ...... | ...... | ...... |

*FIG. 12*

IMAGE CAPTURING APPARATUS, IMAGE CAPTURING METHOD, ALBUM CREATING APPARATUS, ALBUM CREATING METHOD, ALBUM CREATING SYSTEM AND COMPUTER READABLE MEDIUM

TECHNICAL FIELD

This application is a Continuation of application Ser. No. 11/898,633, filed on Sep. 13, 2007 now U.S. Pat. No. 7,868,924, which is a Continuation of copending PCT International Application No. PCT/JP2006/305318 filed on Mar. 13, 2006, which designated the United States, and on which priority is claimed under 35 U.S.C. §120. This application also claims priority under 35 U.S.C. §119(a) on Patent Application No(s). 2005-074288 and 2006-021533 filed in Japan on Mar. 16, 2005 and Jan. 30, 2006. The entire contents of each of the above documents are hereby incorporated by reference. The present invention relates to an image capturing apparatus, an image capturing method, an album creating apparatus, an album creating method, an album creating system and a computer readable medium. Particularly, the present invention relates to an image capturing apparatus and an image capturing method, an album creating apparatus for creating an album of images, an album creating system including the image capturing apparatus and the album creating apparatus and a computer readable medium storing thereon a program for the image capturing apparatus and the album creating apparatus.

BACKGROUND ART

Conventionally, an album creating system for creating an album has been known that the map of travel destination is disposed at the center of a screen, images are disposed around the map based on tag information such as position information and image-capturing time information associated with image data captured in traveling, and the images and the image-capturing positions on the map are connected by lines, so that the relationship between the map and the images can be identified, for example as disclosed in Japanese Patent Application Publication No. 10-126731.

DISCLOSURE OF THE INVENTION

Problems to be Solved by the Invention

However, when an album is created by the above disclosed technology, an image on which tourists who have no relationship with the main character of the album are shown may be stored in the album sometimes. Such album is not good for the viewer at all. Therefore, it is preferred that images on which persons close to the viewer of the album are shown are selected to create the album. However, the creator of the album does not easily know the relationship between persons shown on the image. Therefore, it is required to take a long time to create the album.

Thus, it is an object of the present invention to provide an image capturing apparatus, an image capturing method, an album creating apparatus, an album creating method, an album creating system and a program which are capable of solving the problem accompanying the conventional art. The above and other objects can be achieved by combining the features recited in independent claims. Then, dependent claims define further effective specific example of the present invention.

Means for Solving the Problem

To solve the above-described problem, a first aspect of the present invention provides an image capturing apparatus. The image capturing apparatus includes: an image capturing section for capturing images; a person determining section for determining whether any person is included in the image captured by the image capturing section; an input notification section for notifying a user that a person included in the image captured by the image capturing section should be inputted when the person determining section determines that the image includes the person; a personal identification information input section for causing the user to input personal identification information indicative of the person included in the image captured by the image capturing section by a predetermined timing after the input notification section notifies the user that the person included in the image captured by the image capturing section should be inputted; and an image storage section for storing the personal identification information inputted by the personal identification information input section in association with the image captured by the image capturing section when the personal identification information inputs the personal identification information.

The image capturing apparatus may further include a personal image extraction section for extracting the personal image included in an image newly captured by the image capturing section and a personal identification information retrieval section for retrieving personal identification information indicative of the person included in the image newly captured by the image capturing section by comparing the person extracted by the personal image extraction section with the image stored in the image storage section. The image storage section may store the personal identification information retrieved by the personal identification information retrieval section in association with the image newly captured by the image capturing section.

The image capturing apparatus may further include a retrieved person notification section for notifying the user of the person indicated by the personal identification information retrieved by the personal identification information retrieval section, a confirmation information input section for causing the user to input confirmation information whether the person notified by the retrieved person notification section is the person included in the image newly captured by the image capturing section and an image storage control section for controlling the image storage section to store the personal identification information retrieved by the personal identification information retrieval section in association with the image newly captured by the image capturing section when the confirmation information inputted from the confirmation information input section indicates that the person notified by the retrieved person notification section is the person included in the image newly captured by the image capturing section.

The image capturing apparatus may further include a related personal information storage section for storing the personal identification information on a plurality of persons probably shown on the same image in association with each other. In the case of the personal image extraction section extracts a plurality of persons from the image newly captured by the image capturing section, when the image storage section stores personal identification information on a first person extracted by the personal image extraction section and not store personal identification information on a second person extracted by the personal image extraction section, the personal image extraction section may extract the image of the first person included in the image newly captured by the image capturing section. The personal identification information retrieval section retrieves the personal identification information indicative of the first person by comparing the image of the first person extracted by the personal image extraction section with the image stored in the image storage section. The personal identification information retrieval section may further retrieve the personal identification information stored in the related personal information storage section in association with the retrieved personal identification information indicative of the first person as the personal identification information of the second person.

The image capturing apparatus may further include a person group recording section for recording a plurality of person group including personal identification information indicative of at least one person, respectively, a person group selecting section for notifying the user of at least one person group recorded on the person group recording section and causing the user to select the same when the personal identification information input section does not input personal identification information and a personal identification information selecting section for notifying the user of the personal identification information indicative of at least one person included in the person group selected by the person group selecting section and causing the user to select the same. The image storage section may store the personal identification information selected by the personal identification information selecting section in association with the image captured by the image capturing section.

A second aspect of the present invention provides an image capturing method. The image capturing method includes the steps of: capturing images; determining whether the image captured in the image capturing step includes any person; notifying a user that the person included in the image captured in the image capturing step should be inputted when it is determined that the image includes the person in the person determining step; causing the user to input personal identification information indicative of the person included in the image captured in the image capturing step by a predetermined timing after notifying the user that the person included in the image captured in the image capturing step should be inputted; and storing the personal identification information inputted in the personal identification information inputting step in association with the image captured in the image capturing step.

A third aspect of the present invention provides a program for an image capturing apparatus for capturing images. The program operates the image capturing apparatus to function as: an image capturing section for capturing images; a person determining section for determining whether any person is included in the image captured by the image capturing section; an input notification section for notifying a user that a person included in the image captured by the image capturing section should be inputted when the person determining section determines that the image includes the person; a personal identification information input section for causing the user to input personal identification information indicative of the person included in the image captured by the image capturing section by a predetermined timing after the input notification section notifies the user that the person included in the image captured by the image capturing section should be inputted; and an image storage section for storing the personal identification information inputted by the personal identification information input section in association with the image captured by the image capturing section when the personal identification information inputs the personal identification information.

A fourth aspect of the present invention provides an album creating apparatus. The album creating apparatus includes: an image storage section for storing personal identification information indicative of a person included in a image in association with the image; a related personal information storage section for storing related personal information associated with the personal identification information on the persons closely related to each other; a related personal information extraction section for extracting personal identification information on a person closely related to a designated person who is designated by a user based on the related personal information stored in the related personal information storage section; an image selecting section for selecting the image stored in the image storage section in association with the personal identification information extracted by the related personal information extraction section and an album creating section for creating an album including the image selected by the image selecting section.

The album creating apparatus may further include a designated personal image extraction section for extracting a designated personal image stored in the image storage section in association with personal identification information indicative of the designated person. The album creating section may include an image classification section for classifying a related personal image selected by the image selecting section and a designated personal image extracted by the designated personal image extraction section into different pages in the album and an album generating section for generating each page of the album using the images classified into each page in the album by the image classification section.

The album creating apparatus may further include a designated personal image extraction section for extracting the designated personal image stored in the image storage section in association with the personal identification information indicative of the designated person. The related personal information extraction section may extract personal identification information on a first person and a second person closely related to the designated person based on the related personal information stored in the related personal information storage section. The image selecting section may select a first related personal image stored in the image storage section in association with the personal identification information indicative of the first person extracted by the related personal information extraction section and a second related personal image stored in the image storage section in association with the personal identification information indicative of the second person. The album creating section may include an image classification section for classifying the first related personal image selected by the image selecting section and the designated personal image extracted by the designated personal image extraction section into one page in the album, and also classifying the second related personal image selected by the image selecting section and the designated personal image extracted by the designated personal image extraction section into the other page in the album, and an album generating section for generating each page in the album using the images classified into each page by the image classification section.

The album creating section may include an image classification section for classifying the designated personal image extracted by the designated personal image extraction section and the first related personal image and the second related personal image selected by the image selecting section into one page in the album, and an album generating section for generating one page using the designated personal image, the first related personal image and the second related personal image classified into the one page in the album by the image classification section.

The image classification section may classify the first related personal image and the second related personal image into each page such that the number of the first person is approximately equal to the number of the second person in one page based on the related personal information stored in the related personal information storage section.

The album creating section may further include an area calculating section for calculating the area for the first person and the second person in the image stored in the image storage section based on the related personal information stored in the related personal information storage section. The image classification section may classify the first related personal image and the second related personal image into each page such that the area for the first person is approximately equal to the area for the second person in one image based on the related personal information stored in the related personal information storage section and the area calculated by the area calculating section.

The album creating section may further include an area calculating section for calculating for each page the area for the first person and the second person included in the first related personal image and the second related personal image classified into each page by the image classification section based on the related personal information stored in the related personal information storage section. The album generating section may generate an album by enlarging or reducing the first personal image and the second personal image such that the area for the first person and the area for the second person which are calculated by the area calculating section are substantially equal in one page.

The related personal information storage section stores related personal information associated with the personal identification information on the persons closely related to each other in association with a degree of relationship between the closely related persons. The related personal information extraction section extracts personal identification information indicative of a first person closely related to the designated person and personal identification information indicative of a second person less closely related to the designated person than the first person. The image selecting section may select a first related personal image stored in the image storage section in association with the personal identification information indicative of the first person extracted by the related personal information extraction section and a second related personal image stored in the image storage section in association with the personal identification information indicative of the second person. The album creating section may distinctly lay out the first related personal image than the second related personal image in the page including the first related personal image and the second related personal image selected by the image selecting section.

The album creating section may select the first related personal image and the second related personal image used for the same page such that the number of the first person included in the page having the first related personal image and the second related personal image is more than the number of the second person included in the same page based on the related personal information stored in the related personal information storage section.

The album creating section may include an area calculating section for calculating an area for the first person and an area for the second person in the page including the first related personal image and the second related personal image based on the related personal information stored in the related personal information storage section and the image stored in the image storage section, and an album generating section for selecting the first related personal image and the second related personal image used for the same page such that the area for the first person is larger than the area for the second person.

The related personal information storage section may store the related personal information in association with higher degree of relation in proportion to degree of kindred when the persons are kindred each other.

The related personal information storage section may store the related personal information associated with the personal identification information indicative of a viewer of the album in association with higher degree of relation than the related personal information which is not associated with the personal identification information indicative of a viewer of the album.

The album creating section may include a person determining section for determining whether one image selected by the image selecting section includes both of the designated person and the person closely related to the designated person based on the related personal information stored in the related personal information storage section, a trimming image generating section for a trimming image which includes the designated person and the person closely related to the designated person and in which the designated person is enhanced and an album generating section for generating an album using the trimming image generated by the trimming image generating section.

The related personal information storage section stores related personal information associated with the personal identification information on the persons closely related to each other in association with degree of relationship between the closely related persons. The album creating section may include a person determining section for determining whether one image selected by the image selecting section includes both of the first person and the second person who is less closely related to the designated person than the first person, a trimming image generating section for generating a trimming image including the first person and the second person, where, the first person is more enhanced than the second person and an album generating section for generating an album using the trimming image generated by the trimming image generating section.

A fifth aspect of the present invention provides an album creating method. The album creating method includes the steps of: storing personal identification information indicative of a person included in an image in association with the image; storing related personal information associated with the personal identification information on the persons closely related to each other; extracting the personal identification information on a person closely related to a designated person who is designated by a user based on the related personal information stored in the related personal information storing step; extracting the image stored in the image storing step in association with the personal identification information extracted in the related personal information extracting step; and creating an album including the image extracted in the image extracting step.

A sixth aspect of the present invention provides a program for an album creating apparatus for creating an album. The program operates the album creating apparatus to function as: an image storage section for storing personal identification information indicative of a person included in a image in association with the image; a related personal information storage section for storing related personal information associated with the personal identification information on the persons closely related to each other; a related personal information extraction section for extracting personal identification information on a person closely related to a designated person who is designated by a user based on the related personal information stored in the related personal information storage section; an image selecting section for selecting the image stored in the image storage section in association with the personal identification information extracted by the related personal information extraction section and an album creating section for creating an album including the image selected by the image selecting section.

A seventh aspect of the present invention provides an album creating system including an image capturing apparatus for capturing image and an album creating apparatus for creating an album. The album creating system includes: an image capturing section for capturing images; a person determining section for determining whether the image captured by the image capturing section includes any person; an input notification section for notifying a user that a person included in the image captured by the image capturing section should be inputted when the person determining section determines that the image includes the person; a personal identification information input section for causing the user to input personal identification information indicative of the person included in the image captured by the image capturing section by a predetermined timing after the input notification section notifies the user that the person included in the image captured by the image capturing section should be inputted; an image storage section for storing the personal identification information inputted by the personal identification information input section in association with the image captured by the image capturing section when the personal identification information input section inputs the personal identification information; a related personal information storage section for storing related personal information associated with the personal identification information on the persons closely related to each other; a related personal information extraction section for extracting the personal identification information on a person closely related to a designated person who is designated by the user based on the related personal information stored in the related personal information storage section; an image selecting section for selecting the image stored in the image storage section in association with the personal identification information extracted by the related personal information extraction section; and an album creating section for creating an album including the image selected by the image selecting section.

An eighth aspect of the present invention provides an image capturing apparatus. The image capturing apparatus includes: a personal identification information input section for causing a user to input personal identification information indicative of a person; an image capturing section for capturing images; a person determining section for determining whether the image captured by the image capturing section includes any person when the image is captured by the image capturing section by a predetermined timing after the personal identification information input section inputs the personal identification information; and an image storage section for storing the image captured by the image capturing section and the personal identification information inputted by the personal identification information input section in association with each other when the person determining section determines that the image captured by the image capturing section includes any person.

The personal identification information input section may cause the user to input plural pieces of personal identification information indicative of a plurality of persons, respectively. The image storage section may store the image captured by the image capturing section in association with the plural pieces of personal identification information inputted by the personal identification information input section when the person determining section determines that the image captured by the image capturing section includes any person.

The image capturing apparatus further include the number of person calculating section for calculating the number of persons included in the image captured by the image capturing section when the person determining section determines that the image captured by the image capturing section includes any person. When the person determining section determines that the image captured by the image capturing section includes any person, the image storage section may store the image captured by the image capturing section in association with the plural pieces of personal identification information inputted by the personal identification information input section provided that the number of persons calculated by the number of person calculating section is more than the number of personal identification information inputted by the personal identification information input section.

The image capturing apparatus may further include a person extraction section for extracting a person from a predetermined region in a pre-image captured by the image capturing section before the image capturing section captures a image when personal identification information indicative of a person is inputted by the user in the personal identification information input section, and a person position identification section for identifying the position of the person in the image captured by the image capturing section by matching the person extracted by the person extraction section with the person included in the image captured by the image capturing section. The image storage section may store the image captured by the image capturing section in association with the personal identification information inputted by the personal identification information input section and the position of the person identified by the person position identification section.

The image capturing apparatus may further include a person notification section for notifying the user of the personal identification information in association with the person determined by the person determining section, a confirmation information input section for causing the user to input whether the personal identification information notified by the person notification section indicates the person determined by the person determination section in association with the person determined by the person determining section and an image storage control section for controlling the image storage section to store the image captured by the image capturing section in association with the personal identification information notified by the person notification section when the personal identification information notified by the person notification section indicates the person determined by the person determining section.

A ninth aspect of the present invention provides an image capturing method. The image capturing method includes the steps of: causing the user to input personal identification information indicative of a person; capturing an images; determining whether the image captured in the image capturing step includes any person when the image is captured by a predetermined timing after the personal identification information is inputted in the personal identification information inputting step; and storing the image captured in the image capturing step in association with the personal identification information inputted in the personal identification information inputting step when it is determined that the image captured in the image capturing step includes any person in the person determining step.

A tenth aspect of the present invention provides a program for an image capturing apparatus for capturing images. The program operates the image capturing apparatus to function as: a personal identification information input section for causing a user to input personal identification information indicative of a person; an image capturing section for capturing images; a person determining section for determining whether the image captured by the image capturing section includes any person when the image is captured by the image capturing section by a predetermined timing after the personal identification information input section inputs the personal identification information; and an image storage section for storing the image captured by the image capturing section and the personal identification information inputted by the personal identification information input section in association with each other when the person determining section determines that the image captured by the image capturing section includes any person.

Here, all necessary features of the present invention are not listed in the summary of the invention. The sub-combinations of the features may become the invention.

Effect of the Invention

According to the present invention, personal information on the subject shown on an image can be easily registered. Then, the image on which a desired person is shown as the subject can be selected to create an album.

BRIEF DESCRIPTION OF THE DRAWINGS

FIG. 3 is a table showing an example of data stored in an image storage section 204.

FIG. 4 is a table showing an example of data stored in a related personal information storage section 224;

FIG. 6 is a table showing an example of data stored in a person group recording section 232;

FIG. 11 shows an example of the content of specified subject information;

FIG. 12 shows an example of related personal information;

BEST MODE FOR CARRYING OUT THE INVENTION

Figure 1:
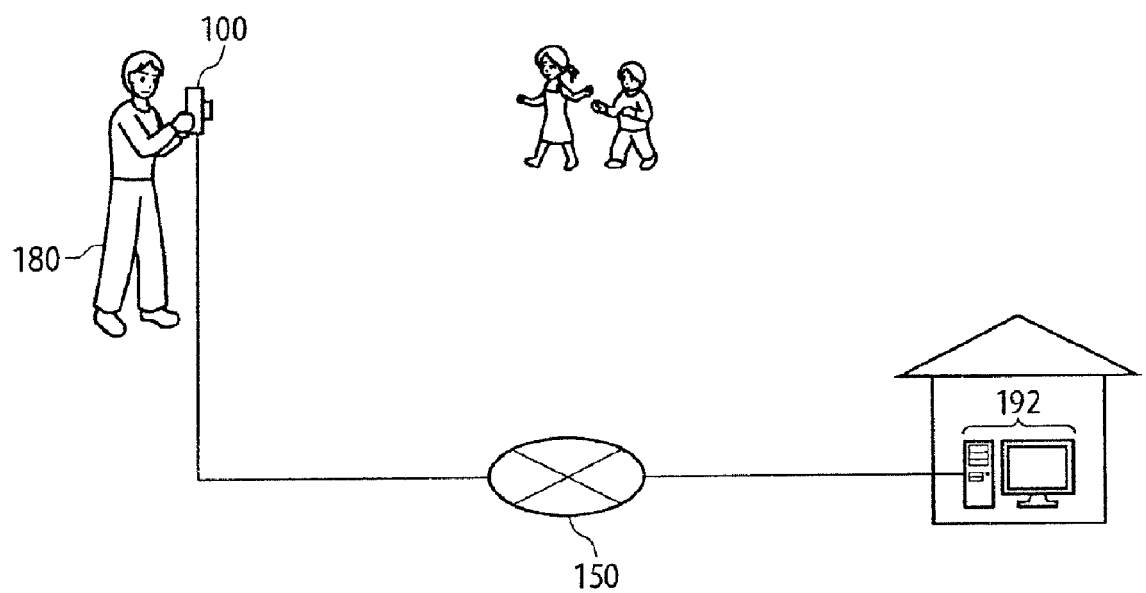
FIG. 1 shows an example of FIG. 1 shows an example of the environment for the usage of an album creating system 170.

FIG. 1 shows an example of the environment for the usage of an album creating system 170 according to an embodiment of the present invention. The album creating system 170 includes an image capturing apparatus 100 and an album creating apparatus 192. When any person is shown on the captured image, the image capturing apparatus 100 causes a user 180 to input personal information such as the name of the person and records the same along with the image. Then, the image capturing apparatus 100 automatically record the personal information on the image when the person having the previously recorded personal information is shown on an image newly captured.

The album creating apparatus 192 receives the image captured by the image capturing apparatus 100 and the personal information on the subject person through a communication line 150 such as Internet or a recording medium such as a semiconductor memory. Then, the album creating apparatus 192 causes the user 180 to designate personal information such as the main character of the album and a person who is presented the album. Then, the album creating apparatus 192 selects images on which the close persons related to the designated person, such as the person oneself and the family of the person are shown based on the personal information recorded on the image to create the album.

Here, the image capturing apparatus 100 may be a digital still camera, a camera cell-phone and a PDA having image capturing function. The album creating apparatus 192 may be an apparatus for displaying on a screen such as a personal computer, an electronic photo-stand and a HDTV. Additionally, the album creating apparatus 192 may be an apparatus for printing images and outputting the same, such as a printer.

The image capturing apparatus 100 may store the images and the personal information in directories provided for each user 180 of the server connected to the communication line 150, such as the directories associated with the image capturing apparatus 100. Then, the output apparatus 140 may receive the image and the personal information on the subject person stored in the server for each user 180.

The above-described album creating system 170 can easily record a subject person in the image captured by the image capturing apparatus 100 on the image. Then, the album creating apparatus 192 can select the image on which the person desired by the main character of the album and the viewer of the album are shown to create the album. Therefore, the user 180 can easily enjoy creating an album.

Figure 2:
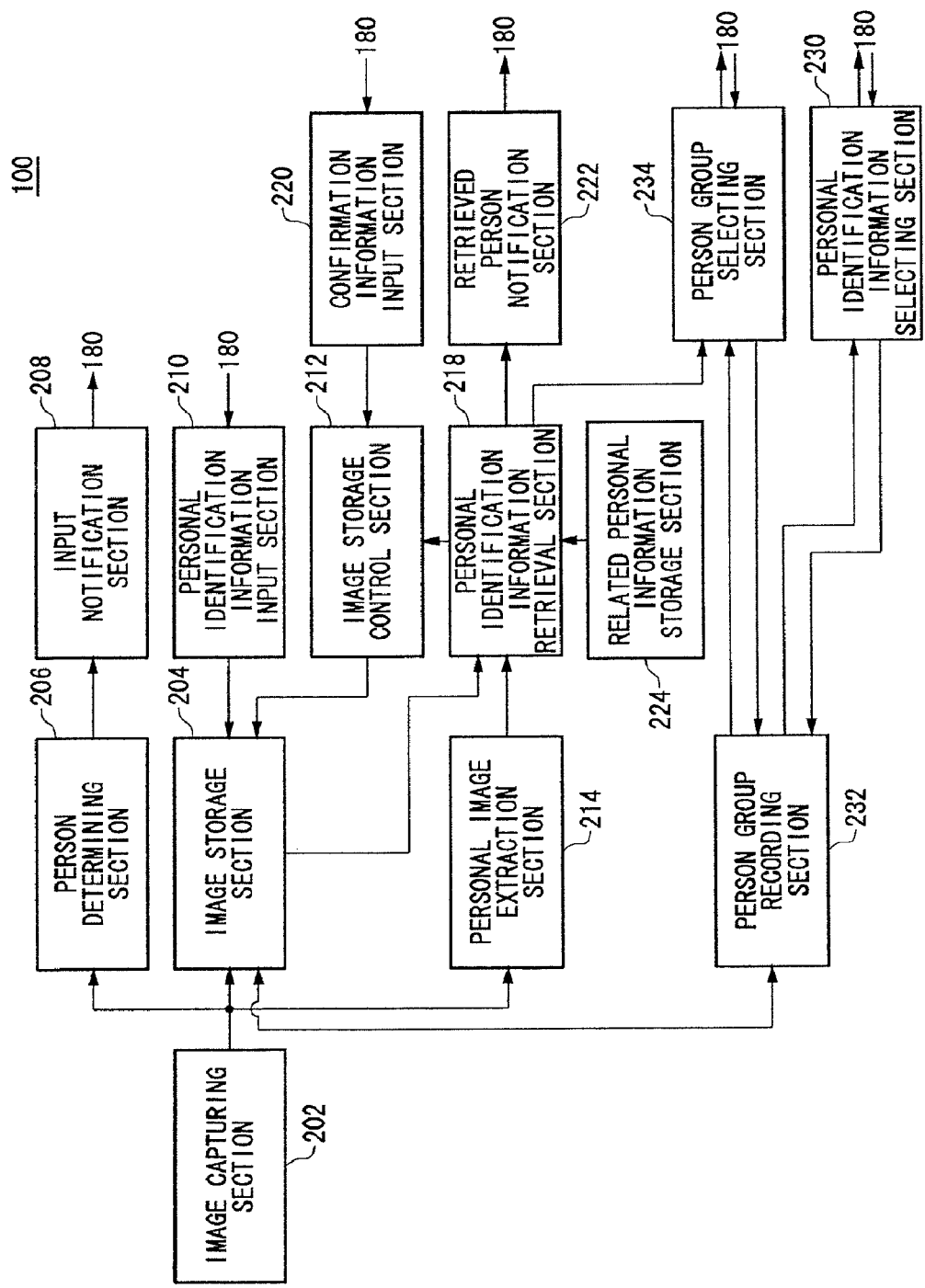
FIG. 2 shows an example of the block configuration of the album creating system 170.

FIG. 2 shows an example of the block configuration of the image capturing apparatus 100. The image capturing apparatus 100 includes an image capturing section 202, an image storage section 204, a person determining section 206, an input notification section 208, a personal identification information input section 210, an image storage control section 212, a personal image extraction section 214, personal identification information retrieval section 218, a confirmation information input section 220, a retrieved person notification section 222, a related personal information storage section 224, personal identification information selecting section 230, a person group recording section 232 and a person group selecting section 234.

The image capturing section 202 captures images. The person determining section 206 determines whether the image captured by the image capturing section includes any person. The input notification section 208 notifies the user 180 that the person included in the image captured by the image capturing section 202 should be inputted when the person determining section 206 determines that the image includes any person.

The personal identification information input section 210 causes the user 180 to input the personal identification information indicative of the person included in the image captured by the image capturing section 202 by a predetermined timing after the input notification section 208 notifies the user 180 that the person included in the person should be inputted. Here, the personal identification information may be the name of the person and also may be the term representing human relationship with the user 180, such as a father and brothers.

The predetermined timing may be a timing at which a predetermined period lapses. Additionally, the predetermined timing may be a timing at which the image capturing apparatus 202 captures a new image and also may be a timing at which displaying of the image captured by the image capturing apparatus 202 is ended. Further, the predetermine timing may be a timing at which the user 180 does not input personal identification information.

When personal identification information is inputted from the personal identification information input section 210, the image storage section 204 stores the personal identification information inputted from the personal identification information input section 210 in association with the image lately captured by the image capturing section 202. Therefore, the user 180 inputs the subject person after the image is captured so that the subject person can be recorded along with the image in the image capturing apparatus 100. Therefore, it is not necessary to input the person before capturing the image, so that it can be prevented from missing a shutter chance.

When the person determining section 206 determines that the image includes any person, the personal image extraction section 214 extracts a personal image included in an image newly captured by the image capturing section 202. The personal identification information retrieval section 218 retrieves personal identification information indicative of the person included in the image newly captured by the image capturing section 202 by comparing the personal image extracted by the person image extraction section 214 with the image stored in the image storage section 204. For example, the personal image extraction section 214 extracts a facial image of the subject person as the personal image. Then, the personal identification information retrieval section 218 retrieves the personal identification information stored in the image storage section 204 in association with the image by comparing the facial image included in the image stored in the image storage section 204 with the facial image extracted by the personal image extraction section 214.

The image storage section 204 stores personal identification information retrieved by the personal identification information retrieval section 218 in association with the image newly captured by the image capturing section 202. Therefore, the user 180 can automatically record the personal identification information at capturing the image without complicated work, such as inputting personal identification information.

The retrieved person notification section 222 notifies the user 180 of the person indicated by the personal identification information retrieved by the person identification retrieval section 218. For example, the retrieved person notification section 222 displays the personal image extracted by the personal image extraction section 214 and the personal identification information such as the name of the person on a monitor screen. Here, the personal identification information retrieval section 218 may retrieve plural pieces of personal identification information. Then, the retrieved image notification section 222 may display a list of the retrieved personal identification information along with the personal image on the monitor screen and cause the user 180 to select among a plural pieces of personal identification information.

The confirmation information input section 220 causes the user 180 to input confirmation information whether the person notified by the retrieved person notification section 222 is the person included in the image newly captured by the image capturing section 202. For example, the confirmation information input section 220 displays a OK button adjacent to the personal image and the personal identification information indicated by the retrieved person notification section 222, which indicates that the person notified by the retrieved person notification section 222 is the person included in the image newly captured by the image capturing section 202.

When the confirmation information inputted from the confirmation information input section 220 indicates that the person notified by the retrieved person notification section 222 is the person included in the image newly captured by the image capturing section 202, the image storage control section 212 controls the image storage section 204 to store the personal identification information retrieved by the personal identification information retrieval section 218 in association with the image newly captured by the image capturing section 202. For example, detecting that the OK button is pushed, the image storage control section 212 may determine that the person notified by the retrieved person notification section 222 is the person included in the image newly captured by the image capturing section 202. Additionally, when the user 180 selects one personal identification information among a list including plural pieces of personal identification information, the image storage control section 212 may determine that the person notified by the retrieved person notification section 222 is the person included in the image newly captured by the image capturing section.

The related personal information storage section 224 stores the personal identification information about a plurality of persons who are probably shown on the same image in association with each other. For example, the related personal information storage section 224 stores personal identification information on persons having kinship such as parents, brothers and children, and relationships with friends in association with each other.

In the case that the personal image extraction section 214 extracts a plurality of persons from the image newly captured by the image capturing section 202, when the image storage section 204 stores the personal identification information on a first person extracted by the personal image extraction section 214 but does not store the personal identification information on a second person extracted by the personal image extraction section 214, the personal image extraction section 214 extracts the personal image of the first person included in the image newly captured by the image capturing section 202. Then, the personal identification information retrieval section 218 retrieves the personal identification information indicative of the first person by comparing the personal image of the first person extracted by the personal image extraction section 214 with the image stored in the image storage section 204. Further, the personal identification information retrieval section 218 retrieves the personal identification information stored in the related personal information storage section 224 in association with the retrieved personal identification information indicative of the first person as the personal identification information on the second person.

Therefore, even if the personal identification information on the subject person can not be retrieved from the image storage section 204, any person who probably shown on the same image is retrieved from the related personal information storage section 224 and the retrieved person can be presented to the user 180. Thus, the user 180 can more easily select the subject person and record the same on the image.

Here, the related personal information storage section 224 may extract a set of personal identification information on the person who is shown on the same image at a rate higher than a predetermined rate based on the personal identification information included in the image stored in the image storage section, and store the set of extracted personal identification information in association with each other. Therefore, data stored in the related personal information storage section 224 can be updated without inputting data in the related personal information storage section 224 by the user 180's hand.

The person group recording section 232 records a plurality of person group including each of personal identification information indicative of at least one person. The person group selecting section 234 notifies the user of at least one person group recorded on the person group recording section 232 and causes the user to select the same when any personal identification information is not inputted by the personal identification information input section. Additionally, the person group selecting section 234 may notify the user of at least one of person group recorded on the person group recording section 232 and cause the user to select the same when the person identification retrieval section 218 does not retrieve the personal identification information on the person included in the captured image. Additionally, the person group selecting section 234 may select one or more person group including the personal identification information from the personal identification information recorded by the person group recording section 232, notify the user of the selected person group and cause the user to select the same.

Then, the personal identification information selecting section 230 notifies the user of the personal identification information indicative of at least one of person included in the person group selected by the person group selecting section 234 and causes the user to select the same. Then, the image storage section 204 stores the personal identification information selected by the person identification selecting section 230 in association with the image lately captured by the image capturing section 202. Therefore, the user 180 can input persons included in the captured image by selecting operation so that the personal identification information can be easily registered in comparison with when the user 180 directly inputs the personal identification information.

The above-described image capturing apparatus 100 can save the trouble of inputting by the user in order to record information to identify the person on the image. Then, the user 180 can easily select images to be stored in the album and classify images.

FIG. 3 is a table showing data stored in the image storage section 204. The image storage section 204 stores image data, personal identification information and the position on the image on which the person indicated by the personal identification information is shown. Here, the image storage section 204 may store for each image data the personal identification information on a plurality of persons and the positions thereof included one image data.

Then, the personal identification information retrieval section 218 compares the facial image in the personal image extracted by the personal image extraction section 214 with the facial image extracted from the image stored in the image storage section 204 to determine the person included in the image captured the image capturing section 202. For example, the personal identification information retrieval section 218 compares the amount of characteristic of the face extracted from each of the facial images, retrieves the image on which the facial image having coincidence higher than a predetermined coincidence is shown from the image storage section 204 and retrieves the personal identification information stored in association with the image. Here, the amount of characteristic of face may be the shape of the line of face, the shape of features such as eye, nose and mouth, the position of each part in the whole face, or the positional relationship between each of the parts.

FIG. 4 is a table showing data stored in the related personal information storage section 224. The related personal information storage section 224 stores personal identification information and the personal identification information on the related persons. Even if a person of which personal identification information is not stored in the image storage section 203 is shown on the image as the subject, provided that the personal identification information on one person among the subject persons in the captured image can be retrieved, the related personal information retrieval section 218 can retrieve the personal identification information on a person who probably exists the same image on which the one person is shown can be retrieved from the related personal information storage section 224 by referring data stored in the related personal information storage section 224.

Figure 5:
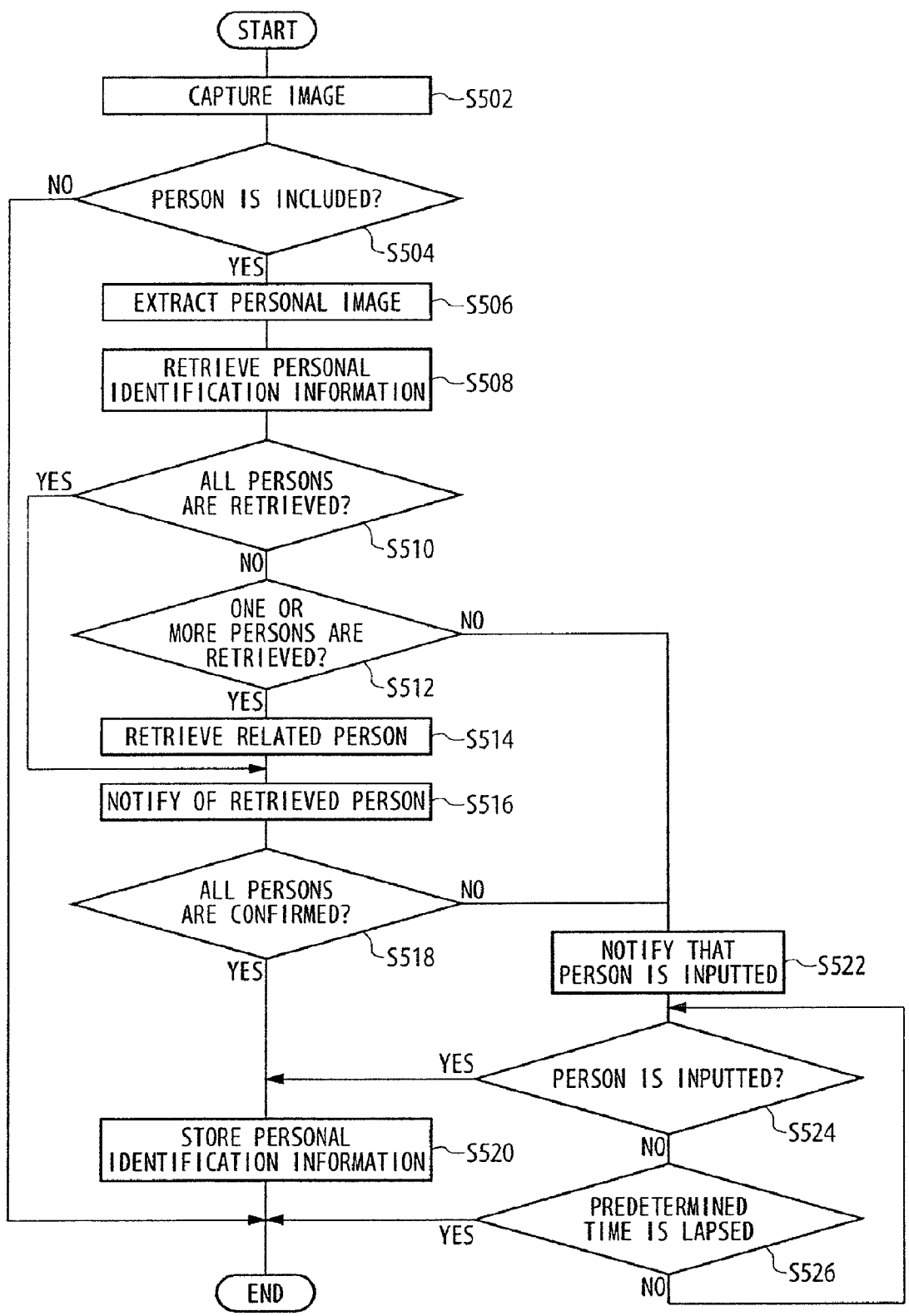
FIG. 5 is a flowchart of the processing to record personal identification information.

FIG. 5 is a flowchart showing the processing to record personal identification information. The image capturing section 202 captures an image (S502), and the person determining section 206 determines whether the image includes any person (S504). For example, the person determining section 206 extracts outlines of a plurality of subjects from the image by edge extraction and determines whether the image includes any person. At this time, the person determining section 206 may determine a partial region on which the subject located more forward is shown based on spatial frequency component calculated for each partial region in the image and determine whether the partial region includes any person.

For example, the person determining section 206 selects the subject included in the partial region. When the shape of the image region within the outline of the subject is vertically long, and a subject having the color close to flesh color in the tip region in the longitudinal direction, the person determining section 206 may determine that the image includes any person. Additionally, the person determining section 206 may determine whether the image includes any person by pattern-matching the outline of the subject extracted in the partial region on which the subject located in more front with the pattern of a predetermined person.

The personal image extraction section 214 extracts a personal image from the captured image (S506). Specifically, the personal image extraction section 214 extracts the amount of characteristic of the person's face from the outline of the subject extracted by the edge extraction in the image region which determined by the image determining section 206 as the region including any person.

The personal identification information retrieval section 218 retrieves the personal identification information on the person of which amount of characteristic has coincidence more than a predetermined value based on the amount of characteristic of the face extracted by the personal image extraction section 214 and the amount of characteristic of the face in the image stored in the image storage section 204 (S508). At this time, the personal identification information retrieval section 218 may retrieve plural pieces of personal identification information. Further, the personal identification information retrieval section 218 may retrieve the personal identification information on one person having the face with the maximum coincidence.

The personal identification information retrieval section 218 determines whether the personal identification information about all persons extracted by the personal image extraction section 214 is extracted (S510). Then, when the personal identification information about all persons are not extracted in S510, the personal identification information retrieval section 218 determines whether the personal identification information on one or more person are retrieved. (S512). When the personal identification information on one or more person are retrieved in S512, the personal identification information retrieval section 218 retrieves a related person who is probably shown on the same image stored in the related personal information storage section 224 (S514). Then, the retrieved person notification section 222 notifies the user 180 of the related person retrieved in S514 (S516). Here, the retrieved person notification section 222 may also notify the user 180 of the person retrieved in S508 along with the person retrieved in S514.

The personal identification information retrieval section 218 determines whether confirmation information indicating that the person notified in the S516 is the person included in the image is inputted from the user 180 for all the persons extracted by the personal image extraction section 214 (S518). When the confirmation information indicating that the notified person is the person included in the image is inputted for all the persons, the personal identification information on the person indicated by the confirmation information is stored in the image storage section 204 (S520), and then, the process is terminated.

If the confirmation information indicating that the notified person is the person included in the image is not inputted for all the persons, the input notification section 208 notifies the user 180 of the person of which confirmation information is not inputted (S522). Then, it is determined whether the user 180 inputs personal identification information through the personal identification information input section 210 (S524). When the personal identification information is inputted by the user 180 in the S524, the process is shifted to S520, and then, the personal identification information inputted in the S524 is stored in the image storage section 204. At this time in the 520, the personal identification information on the person to which the confirmation information indicating that the notified person is the person included in the image is inputted by the user 180 is stored in the image storage section 204.

If the personal identification information is not inputted by the user 180 in the S524, it is determined whether a predetermined time lapses after notifying the user 180 in the S522. If the predetermined time lapses in S526, the process is terminated. Alternatively, if the predetermined time does not lapse in the S526, the process is shifted to the S524.

When personal identification information on one or more persons are not retrieved in the S512, the process is shifted to the S522, and then, the input notification section 208 notifies the user 180 that the personal identification information on all the persons extracted by the personal image extraction section 214 should be inputted. Alternatively, when personal identification information on all the persons are retrieved in the S510, the process is shifted to the S516, and then, the input notification section 208 notifies the user 180 of the extracted persons and requires the user 180 to confirm the personal identification information. Additionally, if any person is not included in the image in the S504, the process is terminated.

As described above, the image capturing apparatus 100 can retrieve the personal identification information on the subjects of the captured image from the images captured in past times and automatically store the same. Additionally, even if any person of which personal identification information is not retrieved is included in the image, provided that the personal identification information on one person is retrieved among a plurality of subject persons, a list including persons who are probably shown on together with the person without the personal identification information is created and the list can be presented to the user 180. Therefore, the user 180 can record the personal identification information along with the image in the image capturing apparatus 100 by a simple operation such as selecting persons from the presented list.

FIG. 6 is a table showing data of the person group stored in a person group recording section 232. The person group section 232 stores person group identification information to identify a person group and one or more pieces of personal identification information to identify persons included in the person group. The person group identification information may be terms representing the human relationship with the user 180, such as kindred and friends. Then, the person group selecting section 234 displays person group identification information on a monitor screen to causes the user 180 to select the same. For example, the person group selecting section 234 displays an question "Kindred?" on the monitor screen and also displays an OK button to indicate a person group selected by the user 180 adjacent to the question. Additionally, the person group selecting section 234 may displays a list of the person group identification information to cause the user 180 to select among the list.

When person group identification information is selected by the user 180, the personal identification information selecting section 230 presents the personal identification information recorded on the person group recording section 232 in association with the person group identification information to the user 180 and causes the user to select the same. Therefore, the user 180 can easily register the personal identification information on the person included in the captured image by selecting operation.

Here, in the case that the personal identification information on the person captured by the image capturing section 202 is not retrieved by the personal identification information retrieval section 212, when any person of which amount of characteristic is similar to the facial image of the captured person, the person group selecting section 234 may select a person group including the personal identification information indicative of the captured person, preferentially present to the user 180 the person group identification information indicative of the selected person group and causes the user 180 to select the same. Therefore, the user 180 can more rapidly register the captured person.

The above-described image capturing apparatus 100 can avoid the trouble of inputting by hand of the user 180 in order to record the personal identification information to identify the person on the image. Then, the user 180 can easily select the image to be stored in the album and classify images based on the personal identification information recorded on the image.

Figure 7:
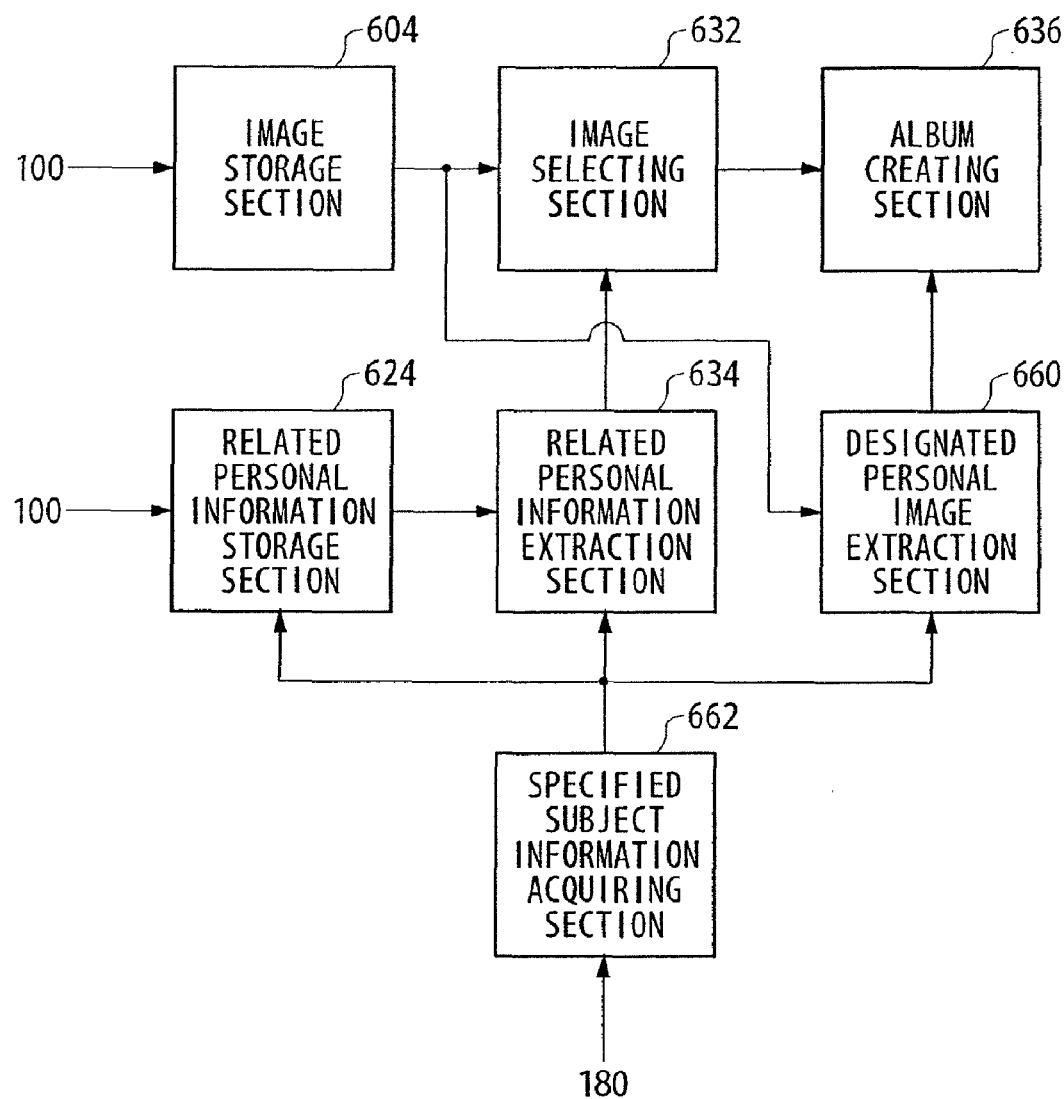
FIG. 7 shows an example of the block configuration of an album creating apparatus 192.
Figure 8:
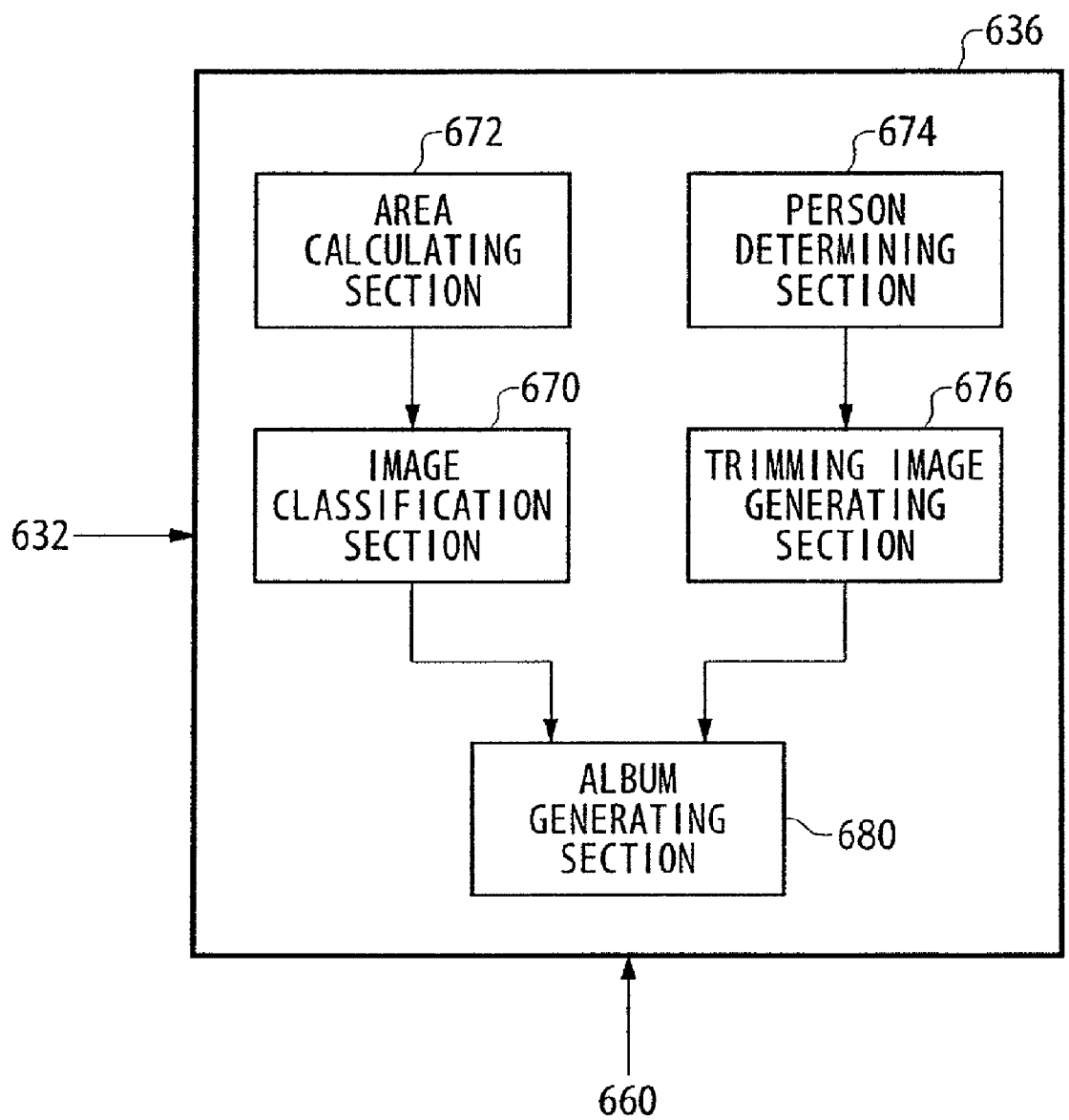
FIG. 8 shows an example of the block configuration of an album creating section 636.

FIG. 7 shows an example of the block configuration of the album creating apparatus 192. The album creating apparatus 192 includes an image storage section 604, a related personal information storage section 624, an image selecting section 632, a related personal information extraction section 634, a designated personal image extraction section 660, a specified subject information acquiring section 662 and an album creating section 636. FIG. 8 shows an example of the block configuration of an album creating section 636. The album creating section 636 includes an area calculating section 672, an image classification section 670, a person determination section 674, a trimming image generating section 676 and an album generating section 680.

The image storage section 604 stores personal identification information indicative of a person included in an image in association with the image. Here, the image storage section 604 may receive the image and the personal identification information from the image storage section 204 and store the same.

The related personal information storage section 624 stores related personal information associated with the personal identification information on the persons closely related to each other. For example, the related personal information storage section 624 stores the personal identification information indicative of the close person who should be shown together with the person indicated by the personal identification information in the same album in association with the personal identification information. For example, the related personal information storage section 624 stores the personal identification information indicative of the parents of the user 180 and the personal identification information indicative of the children of the user 180 in association with each other. Here, data may be previously registered in the related personal information storage section 624 by the user 180.

The related personal information extraction section 634 extracts the personal identification information on the person closely related to a designated person who is designated by the user 180 based on the related personal information stored in the related personal information storage section 624. The image selecting section 632 extracts the image stored in the image storage section 604 in association with the personal identification information extracted by the related personal information extraction section 634. Then, the album creating section 636 creates an album including the image selected by the image selecting section 632.

The designated personal image extraction section 660 extracts a designated personal image stored in the image storage section 604 in association with the personal identification information indicative of the designated person. Then, the image classification section 670 classifies the related personal image selected by the image selecting section 632 and the designated personal image extracted by the designated personal image extraction section 660 into different pages in the album. Then, the album generating section 680 generates each page of the album using the images classified into each page of the album using the images classified into each page in the album by the image classification section 670. Therefore, the album creating apparatus 192 creates a page on which the designated person is shown independent of the pages on which the related persons are shown, so that the designated person can be made an impression with the viewer of the album.

The related personal information extraction section 634 may extract the personal identification information on a first person and a second person who are closely related to the designated person based on the related personal information stored in the related personal information storage section 624. Then, the image selecting section 632 selects a first related personal image stored in the image storage section 604 in association with the personal identification information indicative of the first person extracted by the related personal information extraction section, and a second related personal image stored in the image storage section 604 in association with the personal identification information indicative of the second person. Then, the image classification section 670 classifies the first related personal image selected by the image selecting section 632 and the designated personal image extracted by the designated personal image extraction section 660 into one page of the album, and also classifies the second related personal image selected by the image selecting section 632 and the designated personal image extracted by the designated personal image extraction section 660 into the other page of the album. Then, the album generating section 680 generates each page in the album using images classified into each page by the image classification section 670. Therefore, the album creating apparatus 192 can create the album in which the designated person is enhanced, and persons on each page exhibit good balance.

Additionally, the related personal information extraction section 634 extracts the personal identification information on the first person and the second person closely related to the designated person based on the related personal information stored in the related personal information storage section 624. Then, the image selecting section 634 selects the first related personal image stored in the image storage section 604 in association with the personal identification information indicative of the first person extracted by the related personal information extraction section 634, and the second related personal image stored in the image storage section 604 in association with the personal identification information indicative of the second person. Then, the image classification section 670 classifies the designated person extracted by the designated personal image extraction section 660, and the first related personal image and the second personal image selected by the image selecting section 670 into one page in the album. Then, the album generating section 680 generates one page using designated personal image, the first related personal image and the second related personal image which are classified into the one page by the image classification section 670.

At this time, the image classification section 670 classifies the first related personal image and the second related personal image into each page such that the number of first persons and the number of second persons are substantially equal in one page based on the related personal information stored in the related personal information storage section 624. Additionally, the area calculating section 672 calculates the area for the first person and the second person included in the image stored in the image storage section 604 based on the related personal information stored in the related personal information storage section 624. Then, the image classification section 670 classifies the first related personal image and the second related personal image into each page such that the area for the first person and the area for the second person are substantially equal in one page based on the related personal information stored in the related personal information storage section 624 and the area calculated by the area calculating section 672. Therefore, the album creating apparatus 192 can create the album in which persons other than the designated person are substantially equally enhanced in the page.

Additionally, the area calculating section 672 calculates for each page the area for the first person and the second person included in the first related personal image and the second related personal image classified into each page by the image classification section 670 based on the related personal information stored in the related personal information storage section 624. Then, the album generating section 680 creates the album by enlarging/reducing the first personal image and the second personal image such that the area for the first person and the area for the second person calculated by the area calculating section 672 are substantially equal in one page. Therefore, the album creating apparatus 192 can previously prevent from generating one of the related person is enhanced when a plurality of related persons other than the designated person are included in one page.

Here, the related personal information storage section 624 stores the related personal information associated with the personal identification information on the persons closely related to each other in association with the degree of relation between the closely related persons. Then, the related personal information extraction section 634 extracts the personal identification information indicative of the first person closely related to the specified person and the personal identification information indicative of the second person less closely related to the designated person than the first person. Then, the image selecting section 632 selects the first related personal image stored in the image storage section in association with the personal identification information indicative of the first person extracted by the related personal information extraction section 634 and the second related personal image stored in the image storage section 604 in association with the personal identification information indicative of the second person. The album creating section 636 lays out the first related personal image more distinctly than the second related personal image in the page included in the first related personal image and the second related personal image selected by the image selecting section 632.

Specifically, the album creating section 636 selects the first related personal image and the second related personal image used in the page such that the number of first persons in the page including the first related personal image and the second related personal image is more than the number of second persons included in the page based on the related personal information stored in the related personal information storage section. Additionally, the area calculating section 672 calculates the area for the first person in the page and the area for the second person in the page including the first related personal image and the second related personal image based on the related personal information stored in the related personal information storage section 624 and the image stored in the image storage section 604. Then, the album generating section 680 selects the first related personal image and the second related personal image used in the page such that the area for the first person is larger than the area for the second person, which are calculated by the area calculating section 672.

Specifically, the related personal information storage section 624 stores related personal information in association with higher degree of relation in proportion to degree of kindred when the persons are kindred each other. Additionally, the related personal information storage section 624 may store the related personal information associated with the personal identification information indicative of the viewer of the album in association with degree of relation higher than the related personal image information not associated with the personal identification information indicative of the viewer of the album. Therefore, the album creating apparatus 192 can create the album in which the person who is more closely related to the designated person, such as kindred of the designated person is distinctly laid out in the page.

The person determination section 674 determines whether one image selected by the image selecting section 632 includes both of the designated person and the person closely related to the designated person based on the related personal information stored in the related personal information storage section 624. When the person determination section 674 determines that the one image selected by the image selecting section 632 includes both of the designated person and the person closely related to the designated person, the trimming image generating section 676 generates a trimming image from the image, which includes the designated person and the person closely related to the designated person and in which the designated person is enhanced. For example, the trimming image generating section 676 generates the trimming image in which the designated person is located at the center of the related persons. Then, the album generating section 680 creates the album using the trimming image generated by the trimming image generating section 676. Therefore, the album creating apparatus 192 can create the album in which the designated person is more enhanced than the related person.

Additionally, the person determining section 674 determines whether one image selected by the image selecting section 632 includes both of the first person and the second person who is less closely related to the designated person than the first person based on the related personal information stored in the related personal information storage section 624. Then, when the person determining section 674 determines that the one image selected by the image selecting section 632 includes both of the first person and the second person selected by the image selecting section 632, the trimming image generating section 676 generates a trimming image from the image, which includes the first person and the second person and in which the first person is more enhanced than the second person. For example, the trimming image generating section 676 generates a trimming image in which the first person located closer to the center than the second person. Then, the album generating section 680 creates the album using the trimming image generated by the trimming image generating section 676. Therefore, the album creating apparatus 192 can generate the album in which the first person is more enhanced than the second person.

In the case that the user 180 creates an album using images captured when the user 180 visited the amusement park with his/her children, the above-described album creating apparatus 192 can automatically select images on which the persons closely related to the children of the user 180 such as the user 180 and the family of the user 180 are shown to create the album. Here, images on which the other persons in the amusement park are shown are not selected. Therefore, the user 180 can easily create an album including the images on which desired persons are shown.

Figure 9:
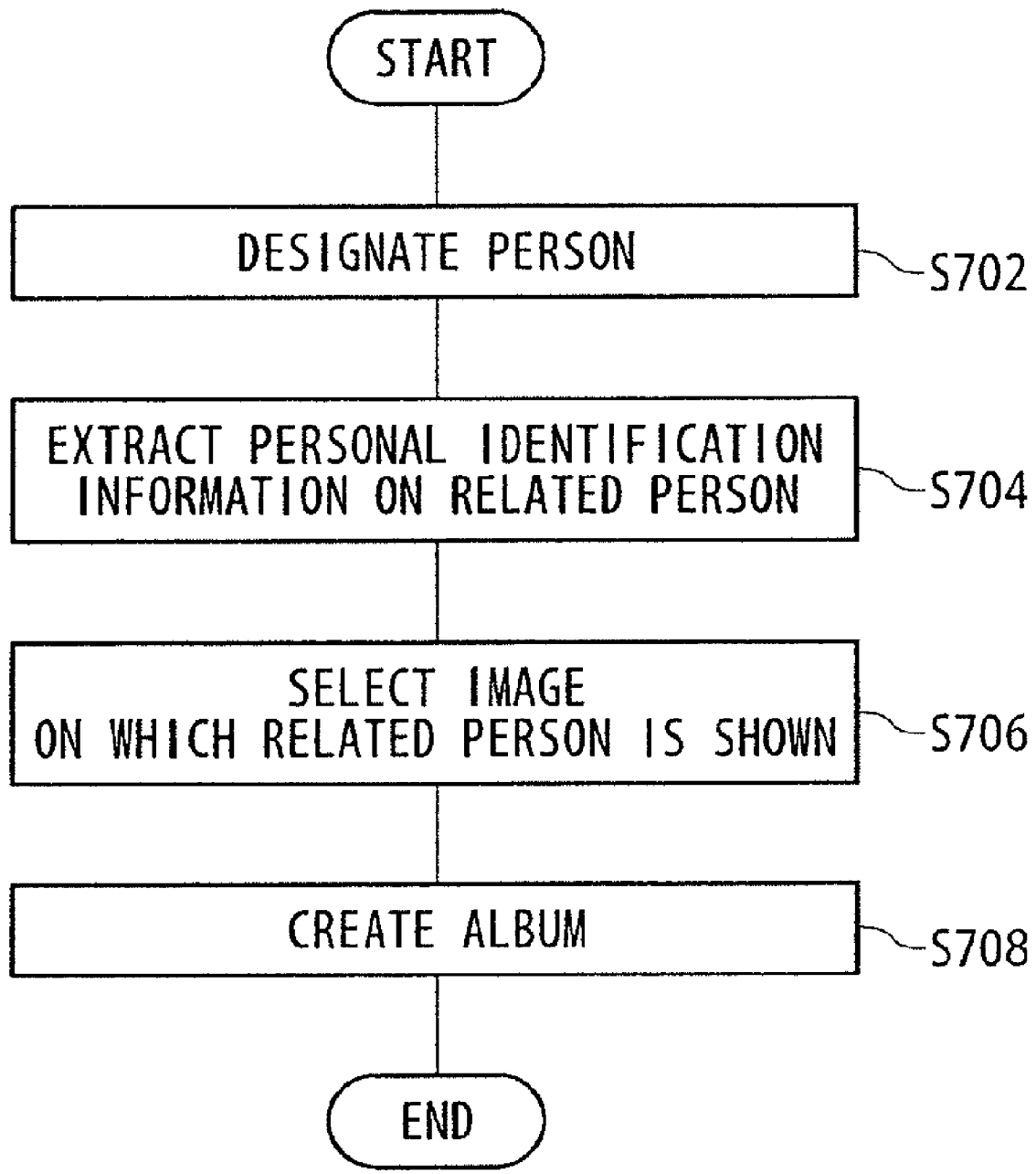
FIG. 9 is a flowchart of the processing to create an album.

FIG. 9 is a flowchart showing the processing to create an album. The related personal information extraction section 634 accepts the designated person from the user 180 (S702). At this time, the user 180 designates a person who will be the main character of the album. Then, the related personal information extraction section 634 extracts the personal identification information on the related person who is closely related to the person designated in the S702 from the related personal information storage section 624 (S704).

Then, the image selecting section 632 selects the image stored in the image storage section 604 in association with the personal identification information on the related person extracted in the S704 (S706). Here, the image selecting section 632 may select more images in which the related person is closer to the center in the image. Additionally, the image selecting section 632 may select more images in which the related person extracted in the S704 is larger.

Then, the album creating section 636 creates the album using the images selected in the S706 (S708). Here, the album creating section 636 may create the album including the images selected in the S706 as the representative image of the album. The representative image may be an image for the cover of the album, an image mainly located at the center of the page in the album and an image for the background of all over one page of the album.

Figure 10:
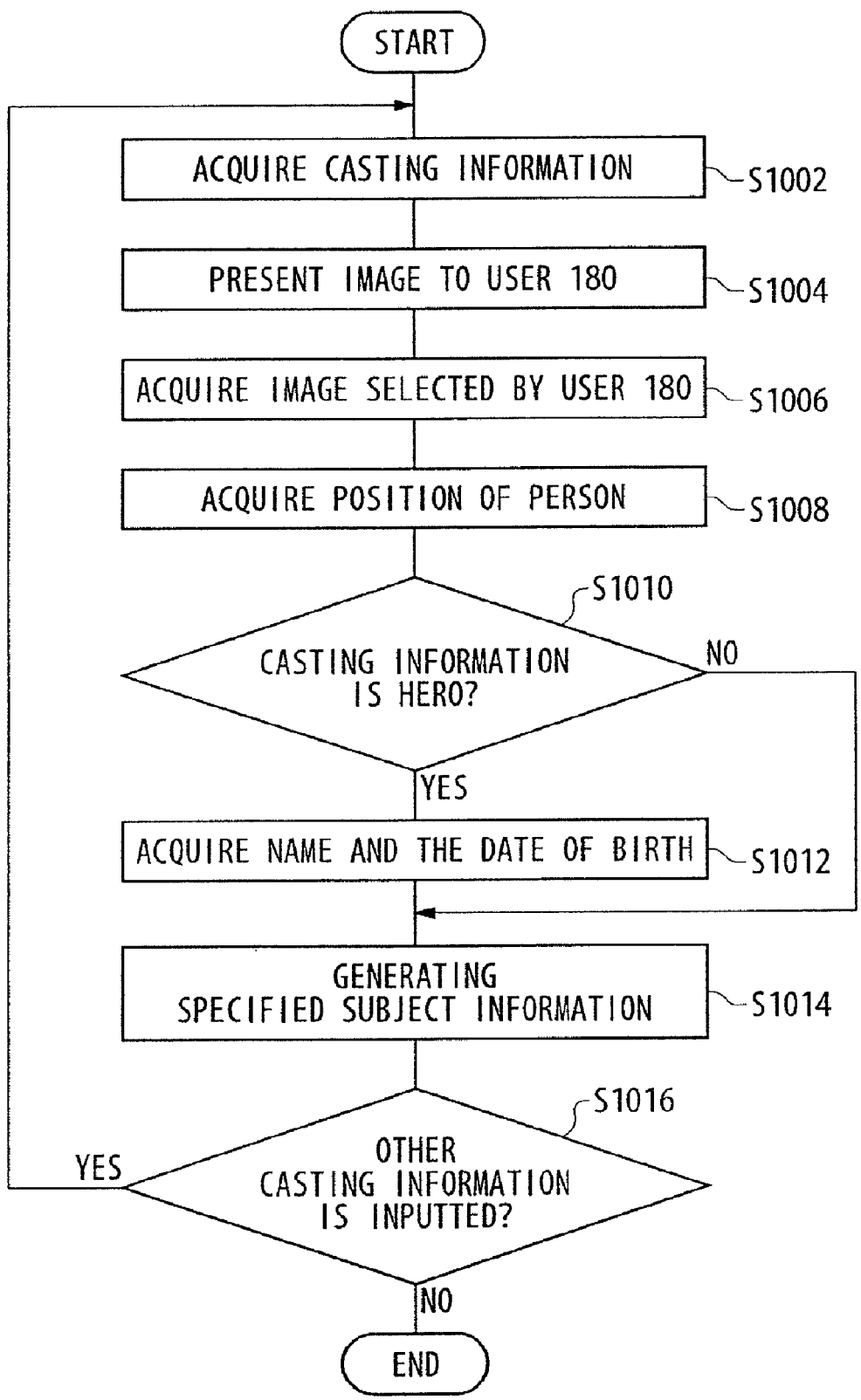
FIG. 10 is a flowchart of the processing to acquire specified subject information.

FIG. 10 is a flowchart showing an example of the processing to acquire specified subject information by the specified subject information acquiring section 662. The specified subject information is information associated with the persons in the album. The specified subject information is utilized in the creating processes of the albums such as laying out images in the album and creating the titles by the album creating apparatus 192. The specified subject information acquiring section 662 causes the user 180 to input casting information indicative of the role of the persons included in the image in the album and acquires the same (S1002). For example, the specified subject information acquiring section 662 causes the user 180 to input "Hero" indicative of the main character of the album, "Father", "Mother", "Brother" and "Sister" indicative of the father, mother, brother and sister of the main character and "Friend" indicative of the friend of the main character as the casting information and acquires the same.

Then, the specified subject information acquiring section 662 displays the image stored in the image storage section 604 and presents the same to the user 180 (S1004). Then, the specified subject information acquiring section 662 causes the user 180 to select the image including the person having the role indicated by the casting information inputted in the S1002 and acquires the same (s1006). At this time, the specified subject information acquiring section 662 stores such as the file name of the selected image. Then, the specified subject information acquiring section 662 causes the user 180 to input the position of the person in the selected image and acquires the same (S1008). For example, the specified subject information acquiring section 662 causes the user 180 to push a button indicative of "Left", "Center" and "Right" and input the position of the person. Then, the specified subject information acquiring section 662 determines whether the casting information inputted in the S1002 is "Hero" (S1010). Then, when it is determined that the casting information is "Hero" in the S1010, the specified subject information acquiring section 662 acquires the name and the date of birth of the person from the user 180 (S1020).

Then, the specified subject information acquiring section 662 generates specified subject information including the casting information inputted in the S1002, the name of the file selected in the S1006, the position inputted in the S1008 and the name and the date of birth acquired in the S1012 (S1014). Here, when it is determined that the casting information is not "Hero" in the S1010, the specified subject information acquiring section 662 shifts the process to S1014, and generates specified subject information including the casting information inputted in the S1002, the name of the file selected in the S1006 and the position inputted in the S1008.

Then, the specified subject information acquiring section 662 presents to the user 180 whether specified subject information on the other persons will be inputted and determines whether the casting information on the other persons will be inputted based on the input by the user 180 (S1016). When it is determined that the casting information on the other persons will be inputted in the S1016, the process is shifted to S1002, and the specified subject information acquiring section 662 causes the user 180 to input the casting information on the other persons. Alternatively, when the specified subject information acquiring section 662 determines that the casting information on the other persons will not be inputted in the S1016, the process is terminated. Here, the person of which casting information is "Hero" is the designated person in the present embodiment and also is the main character of the album. Additionally, the person of which specified subject information is inputted is the related person who is related to the designated person.

As described above, the album creating apparatus 192 causes the user to designate the persons to be appeared in the album and the role of the person in the album to acquire the role of the person in the album. Therefore, the album crating apparatus 192 can appropriately determine the layout of the images in the album depending on the role of the persons in the album.

FIG. 11 shows an example of the content of specified subject information. Specified subject information 1102, 1104 and 1106 indicate the main character of the album, the brother of the main character and the friend of the main character, respectively. The specified subject information 1102, 1104 and 1106 have Name field indicative of the name of the person, File field indicative of the file name of the image, Position field indicative of the position in the image, Casting field indicative of casting information and Date of Birth field indicative of the date of birth. The specified subject information on the main character includes personal information such as the name and the date of birth, but the specified subject information on the persons other than the main character does not include those of personal information. Therefore, the user 180 need not input the personal information on the persons other than the main character, so that the damage can be reduced even if specified subject information is looked by the other person when the user 180 inputs the information in the terminal of Kiosk, and also the damage can be reduced even if data is stolen on communication line such as Internet when each information included in the specified subject information is inputted through the communication line. Additionally, as for the specified subject information indicative of the main character, the specified subject information acquiring section 662 may generate specified subject information by encoding the personal information.

FIG. 12 shows an example of related personal information stored in the related personal information storage section 624. The related personal information storage section 624 stores casting information indicative of the persons indicated by each of the personal identification information and degree of relation based on the casting information in addition to the related personal information received from the related personal information storage section 224. For example, the related personal information storage section 624 stores "Hero", "Friend" and "Brother" in association with personal identification information A,B and C, respectively based on the casting information acquired by the specified subject information acquiring section 662.

Additionally, the related personal information storage section 624 further stores the degree of relation according to the casting information in association with the personal identification information. For example, the related personal information storage section 624 stores, in association with the personal identification information A, degree of relation (10) for the person (indicated by the personal identification information C) of which casting information is "Brother" higher than degree of relation (3) for the person (indicated by the personal identification information B) of which casting information is "Friend" as degree of relation to the person indicated by the personal identification information A. Here, the related personal information storage section 624 previously stores the degree of relation in association with the casting information, and may store, in association with each personal identification information, the degree of relation stored in association with the casting information included in the specified subject information acquired by the specified subject information acquiring section 662.

Additionally, the specified subject information acquiring section 662 may acquire the casting information indicative of the viewer of the album. Then, the related personal information storage section 624 may store, in association with the personal identification information of the person of which casting information indicates the viewer of the album, the degree of relation larger than the degree of relation associated with the personal identification information on the person of which casting information indicates that the person is not the viewer of the album. Therefore, the album creating apparatus 192 can create the album with the layout in which the viewer of the album is enhanced. Accordingly, the album creating apparatus 192 can create the album with the layout which is desired by the viewer of the album.

Figure 13:
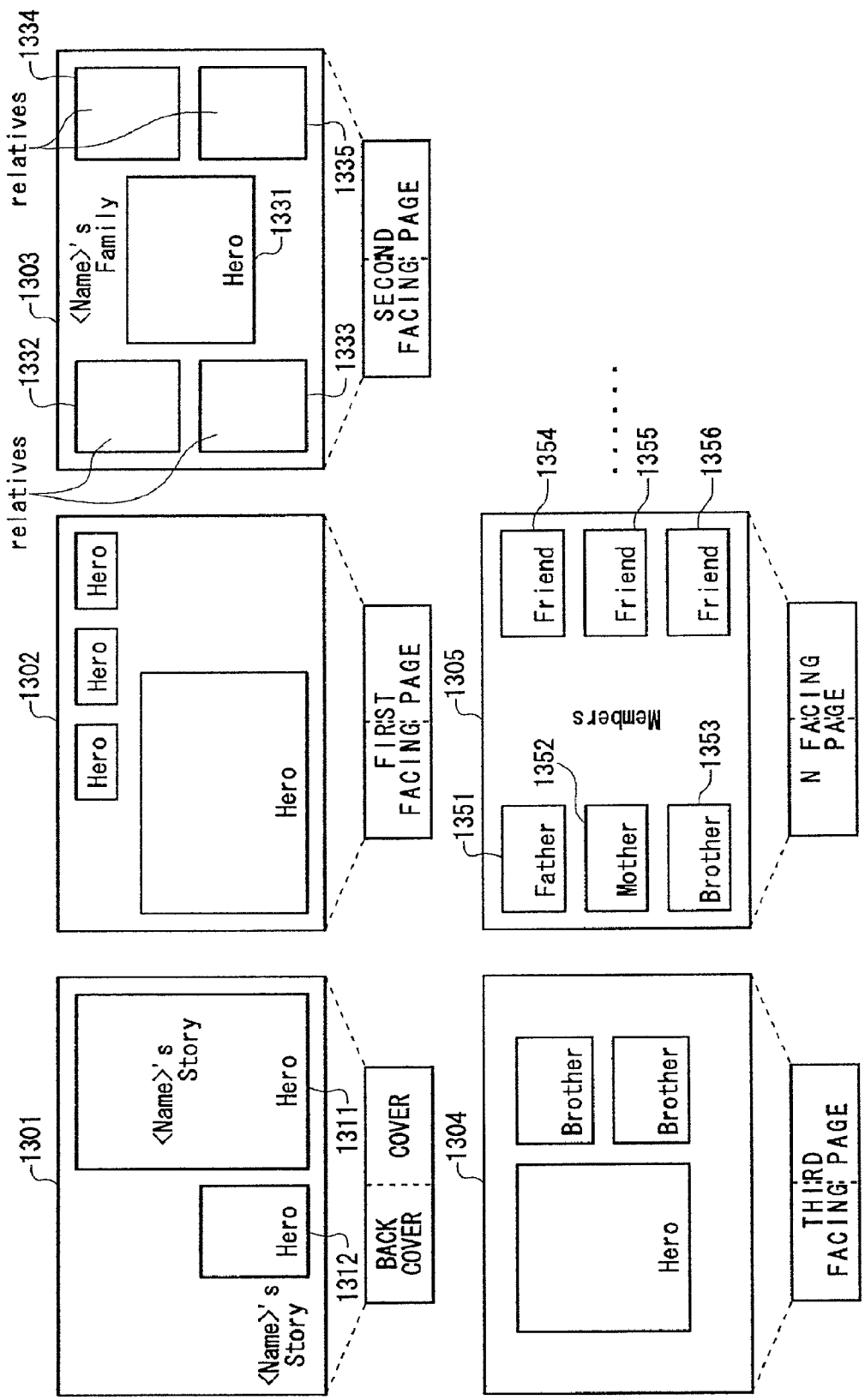
FIG. 13 shows an example of a template stored in the album creating section 636.

FIG. 13 shows an example of a template stored in the album creating section 636. A template 1301 shows an example of a template of the cover and the back cover of the album. Each of templates 1302-1305 show an example of the template of a facing page. Casting information of the person included in the image fitted into an image frame is set to each of the image frames indicated by the template. For example, it is determined that the image including the person of which Casting field is "Hero" is fitted into the frame 1311 and 1312 indicated by the template 1301. Additionally, it is determined that the images of the persons of which Casting fields are "Father", "Mother" and "Brother" are fitted into image frames 1351-1353 of the template 1305.

Here, the designated personal image extraction section 660 extracts the image of the designated person from the image area within a predetermined distance from the position of Position field of the specified subject information in the image of which file name is indicated by File field of the specified subject information of which Casting field is Hero. Then, the designated personal image extraction section 660 extracts as the image of the designated person the image including the subject matched with the image of the designated person by the coincidence more than a predetermined coincidence by matching the subject included in the image stored in the image storage section 604 with the image of the designated person. In the same way, the image selecting section 632 can select the image of the related persons based on the specified subject information of which Casting field is other than "Hero".

Then, the album creating section 636 selects the image among the images extracted by the designated personal image extraction section 660 and fits the same into the image frame into which the image of "Hero" should be fitted. Additionally, the album creating section 636 selects the image among the images selected by the image selecting section 632 and fits the same into the image frame into which the image of which Casting field is other than "Hero" should be fitted.

Here, "Relatives" set to the image frames 1332-1335 is the generic name of the casting information indicative of a family including "Father", "Mother", "Brother" and "Sister". The album creating section 636 fits an image having any of "Father", "Mother", "Brother" and "Sister" as casting information into the image frame to which "relatives" is set.

The layout and the content of the text indicative of the album title and the page titles are previously determined in the template. For example, <Name>'s Story is determined in the template 1301 as the text for the album title. Additionally, <Name>'s Family and Members are determined in the templates 1303 and 1305, respectively.

Here, the title text defined in the template includes text replacement information indicating that at least of a part of the text should be replaced with field data included in the subject identification information. For example, the text of titles defined in the 1301 and 1303 include text replacement information <Name> indicating that it should be replaced with Name field. Then, the album creating section 636 replaces a part of the text indicated by text replacement information <Name> with data in the Name field specified by the specified subject information of which Casting field is "Hero" to generate the text for each title. Therefore, the album creating apparatus 192 can use the title suitable for the specified main character. As described above, the album creating apparatus 192 can create the album in which images are arranged with the appropriate layout according to the specified subject information designated by the user 180.

Figure 14:
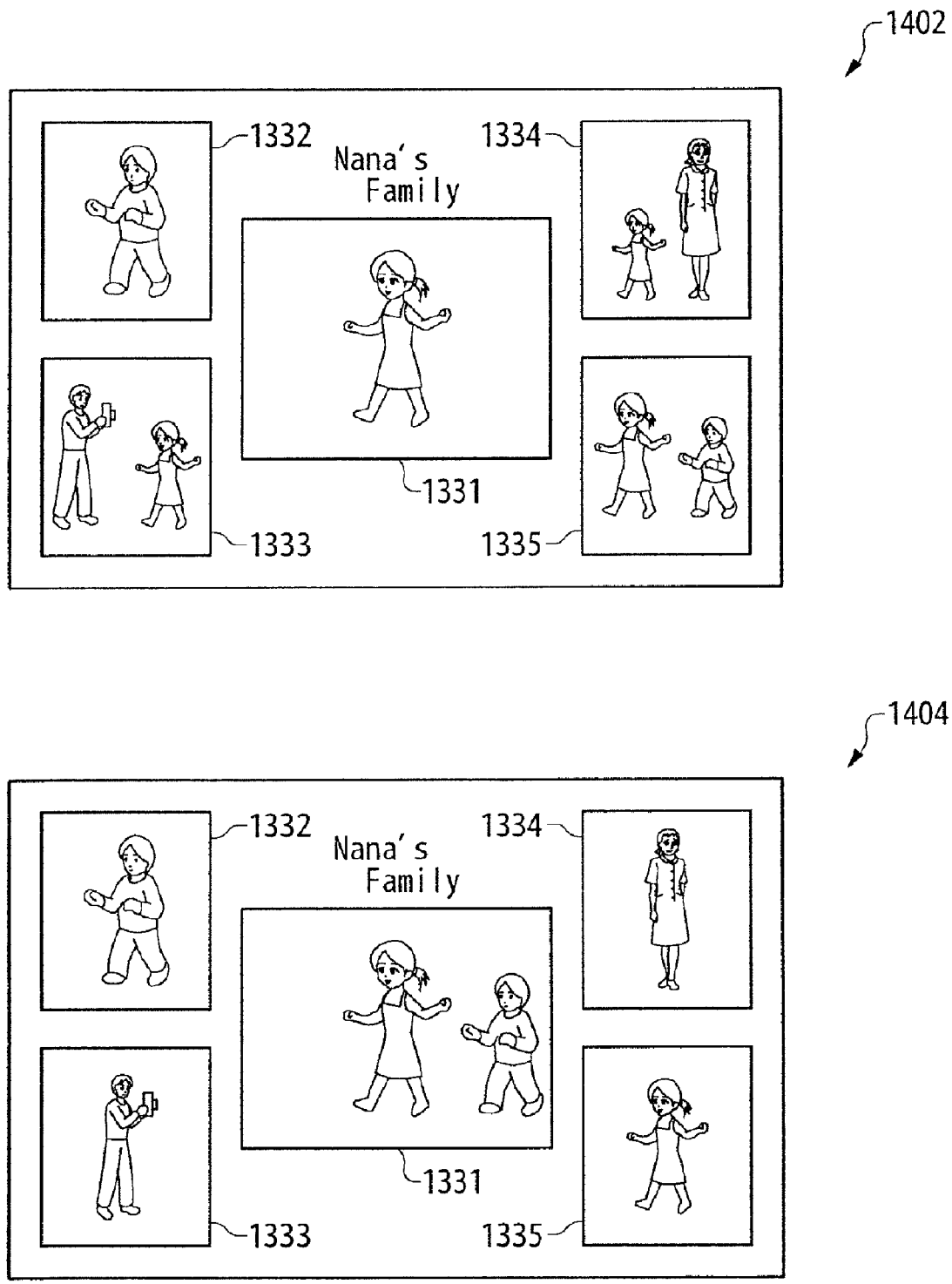
FIG. 14 shows an example of the layout result of pages in an album.

FIG. 14 shows an example of layout results 1402 and 1404 of pages generated by the album creating section 636. The album creating section 636 fits images into image frames 1331-1335 defined in the template 1303 to generate the pages with the layout indicated by the layout results 1402 and 1404. The album creating section 636 fits the image including the person of which Casting field is "Hero" extracted by the designated personal image extraction section 660 into the image frame 1331. Then, the album creating section 636 fits the image including the person of which Casting field is relatives selected by the image selecting section 632 into the image frames 1332-1335. Therefore, the layout results 1402 and 1404 can be obtained.

Here, the album creating section 636 may enlarge a trimming image obtained by trimming the image extracted by the designated personal image extraction section 660 and fit the same into the image frame 1331 such that the area for the designated person (of which Casting field is "Hero") is larger than the area for the persons other than the designated person (of which Casting field is other than "Hero") included in the image frames 1331-1335 in one page. Additionally, the album generating section 680 may select images to be fitted into the image frames 1332-1335 such that the number of the designated person is more than the number of the persons other than the designated person included in the image frame 1331-1335 in one page.

The layout result 1404 is an example of the layout result of the images including the designated person and the persons other than the designated person. When the designated personal image extraction section 660 selects any image including the designated person and persons other than designated person, the trimming image generating section 676 trims the image such that the designated person is centrically located. Then, the album generating section 680 fits the image trimmed by the trimming image generating section 676 into the image frame 1331. In the same way, the trimming image generating section 676 may generate a trimming image in which the person associated with higher degree of relation is centrically located from the image including a plurality of related persons. Thus, the album creating apparatus 192 can create the album with the layout in which the designated person and the person more closely related to the designated person are enhanced.

Figure 15:
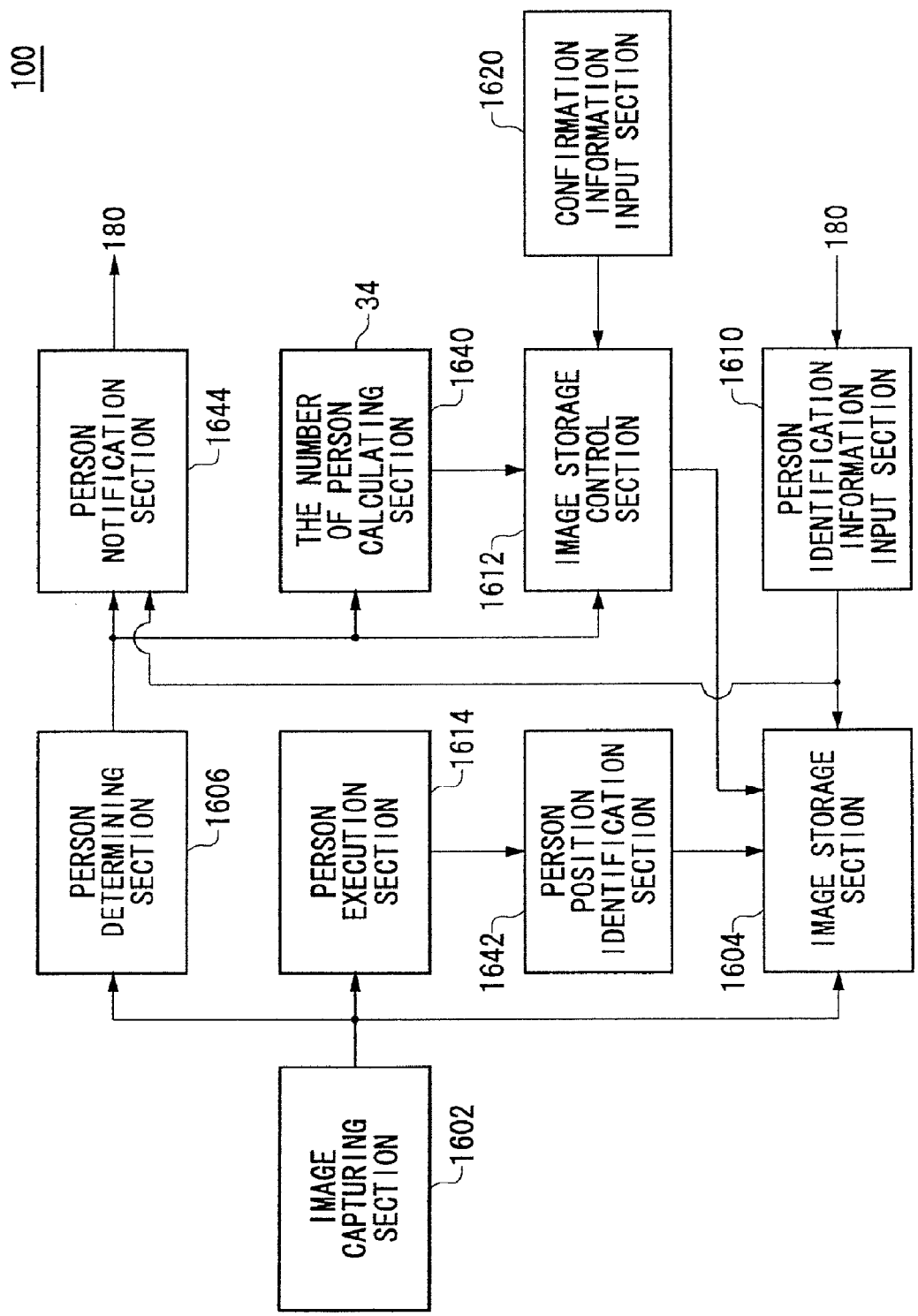
FIG. 15 shows an example of the block configuration of an image capturing apparatus 100 according to another embodiment.

FIG. 15 shows an example of the block configuration of the image capturing apparatus 100 according to another embodiment. The image capturing apparatus 100 according to the present embodiment previously acquire information to identify persons in the captured image from the user 180. Here, the environment for the usage of the image capturing apparatus 100 according to the present embodiment is same as that described with reference to FIG. 1, so that the description is omitted. The image capturing apparatus 100 includes an image capturing section 1602, an image storage section 1604, a person determination section 1606, a personal identification information input section 1610, an image storage control section 1612, a person extraction section 1614, a confirmation information input section 1620, the number of person calculating section 164, a person position identification section 1642 and a person notification section 1644.

The personal identification information input section 1610 causes the user 180 to input personal identification information indicative of a person. The personal identification information input section 1610 stores the inputted personal identification information on such as a volatile memory.

The image capturing section 1602 captures images. At this time, the person determination section 1606 determines whether the image captured by the image capturing section 1602 includes any person when the image capturing section 1602 captures any image by a predetermined timing after the personal identification information input section 1610 inputs personal identification information. Then, when the person determining section 1606 determines that the image captured by the image capturing section includes any person, the image storage section 1604 stores the image captured by the image capturing section 1602 and the personal identification information inputted by the personal identification information input section 1610 in association with each other. Specifically, when the person determining section 1606 determines that the image captured by the image capturing section 1602 includes any image, the image storage control section 1612 controls the image storage section 1604 to store the image captured by the image capturing section 1602 and the personal identification information inputted by the personal identification information input section 1610 in association with each other.

Here, the personal identification information input section 1610 may causes the user 180 to input plural pieces of personal identification information indicative of a plurality of persons, respectively. At this time, the image storage section 1604 stores the image captured by the image capturing section 1602 and the plural pieces of personal identification information inputted by the personal identification information input section 1610 in association with each other provided that the person determining section 1606 determines that the image captured by the image capturing section 1602 includes any image.

Here, when the person determining section 1606 determines that the image captured by the image capturing section 1602 includes any image, the number of person calculating section 1640 calculates the number of persons included in the image captured by the image capturing section 1602. Then, when the person determining section 1606 determines that the image captured by the image capturing section 1602 includes any image, the image storage control section 1612 may control the image storage section 1604 to store the image captured by the image capturing section 1602 and the plural pieces of personal identification information inputted by the personal identification information input section 1610 in association with each other provided that the number of persons calculated by the number of person calculating section 1640 is more than the number of personal identification information inputted by the personal identification information input section 1610.

When the personal identification information is inputted by the user 180 in the personal identification information input section 1610, the person extraction section 1614 extracts a person from a predetermined region in a pre-image captured by the image capturing section 1602 before the image capturing section 1602 captures an image. The person extraction section 1614 extracts the person from a predetermined range including the center of the pre-image, that is, a predetermined range around the focal position. Then, the person position identification section 1642 identifies the position of the person in the image captured by the image capturing section 1602 by matching the person extracted by the person extraction section 1614 with the person included in the image captured by the image capturing section 1602. Then, the image storage section 1604 stores the image captured by the image capturing section 1602, the personal identification information inputted by the personal identification information input section 1610 and the position of the person identified by the person position identification section 1642 in association with each other.

Here, the pre-images may be images continuously captured when the image capturing apparatus 100 is set to be able to capture images. The image capturing apparatus 100 displays the pre-images on the monitor screen of the image capturing apparatus 100 as monitor images to confirm the image-capturing range and set the image capturing condition by the user 180.

The person notification section 1644 notifies the user 180 of the personal identification information in association with the person determined by the person determining section 1606. Then, the confirmation information input section 1620 causes the user 180 to input whether the personal identification information notified by the person notification section indicates the person determined by the person determining section 1606 in association with the person determined by the person determining section 1606. Then, when the confirmation information inputted by the confirmation information input section 1620 indicates that the personal identification information notified by the person notification section indicates the person determined by the personal determining section 1606, the image storage control section 1612 causes the image storage section 1604 to store the image captured by the image capturing section 1602 and the personal identification information notified by the person notification section in association with each other.

Figure 16:
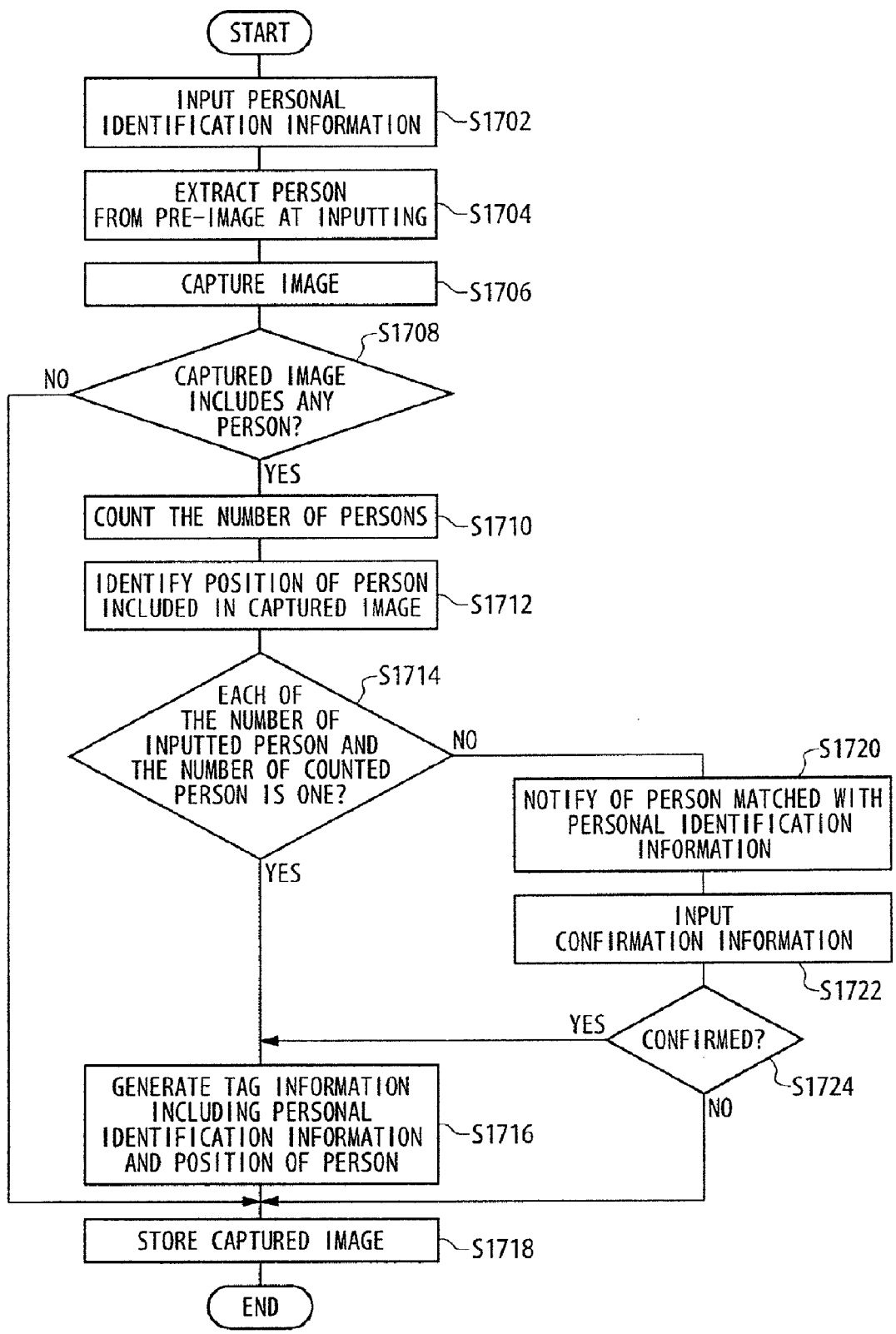
FIG. 16 is a flowchart of processing to record personal identification information by the image capturing apparatus 100.

FIG. 16 is a flowchart showing the processing to record personal identification information by the image capturing apparatus 100. Personal identification information is inputted by the user 180 in the personal identification information input section 1610 (S1702). The personal identification information input section 1610 may cause the user 180 to select the personal identification information among the list stored in the image storage section 1604 in association with images. Additionally, the personal identification information input section 1610 may present the personal identification information indicative of a predetermined human relationship such as parents, brothers and friends to the user 180 and causes the user to select the same. Here, the personal identification information input section 1610 may cause the user 180 to input casting information as the personal identification information, which is inputted by the user 180 when the album creating apparatus creates an album. Additionally, the personal identification information input section 1610 may identify words said by the user 180 by analyzing the voice from the user 180 and input the identified words as the personal identification information.

Then, the person extraction section 1614 extracts the person from a predetermined range in pre-images captured by the image capturing section 1602 at the timing at which the personal identification information input section 1610 inputs the personal identification information (S1704). Here, the person extraction section 1614 may acquire the pre-image at the timing at which the release button of the image capturing apparatus 100 is half-pushed and extract the person from a predetermined region in the pre-image. For example, in the image capturing apparatus 100, a mark is indicated at a predetermined position on the monitor screen on which the pre-images are displayed, and the user 180 half-pushes the release button to fit the mark, so that the person is extracted from the image within a predetermined range including the position of the mark. Therefore, the image capturing apparatus 100 can appropriately determine the intention of the user 180 at inputting the personal identification information.

Then, the image capturing section 1602 captures an image instructed by the user 180 (S1706). Then, the personal determining section 1606 determines whether the captured image includes any person (S1708). When the person determining section 1606 determines that the captured image includes any image in the S1708, the number of person calculating section 1640 counts the number of persons included in the captured image (S1710). Then, the image position identification section 1642 identifies the position of the person included in the image captured in the S1706 (S1712).

Then, the image storage control section 1612 determines whether each of the number of person of which personal identification information has been inputted and the number of person counted in the S1710 is one (S1714). When it is determined in the S1714 that each of the number of person of which personal identification information has been inputted and the number of person counted in the S1710 is one, the image storage control section 1612 generates information including the personal identification information inputted in the S1702 and the position of the person identified by the person position identification section 1642 as tag information to be attached to the image captured in the S1702 (S1716). Then, the image storage control section 1612 causes the image storage section 1604 to store the tag information generated in the S1714, which is attached to the captured image (S1718).

Here, when the image storage control section 1612 determines that either of the number of persons of which personal identification information has been inputted or the counted number of persons is not one, the person notification section 1644 notifies of the person matched with the highest coincidence among the persons included in the captured image by matching the personal images extracted in the S1704 with the personal images included in the captured image (S1720). At this time, the person notification section 1644 notifies of the person with the highest coincidence for each personal identification information inputted in the S1702.

Then, the confirmation information input section 1620 causes the user 180 to input confirmation information indicating whether the presented personal identification information is matched with the person included in the captured image (S1722). Then, the image storage control section 1612 determines whether the confirmation information indicating that the presented personal identification information is matched with the person included in the captured image from the confirmation information inputted in the S1722 (S1724). When the image storage control section 1612 determines that the above-described confirmation information is inputted in the S1724, the process is shifted to S1716, and then, the image storage control section 1612 generates tag information including the personal identification information on the person of which confirmation information has been inputted and the position in the captured image. Alternatively, when the image storage control section 1612 determines that the above-described confirmation information is not inputted in the S1722, the process is shifted to S1718, and then, the image storage control section 1612 causes the image storage section 1604 to store the captured image with the tag information which does not include personal identification information.

When the person determination section 1606 determines that the captured image does not include any person in the S1708, the process is shifted to S1718, and then, the image storage control section 1612 causes the image storage section 1604 to store the captured image without the personal identification information as the tag information. Here, when the number of persons counted is less than the number of personal identification information inputted in the S1714, the process is shifted to S1718, and then, the image storage control section 1612 may cause the image storage section 1604 to store the captured image without the personal identification information as the tag information.

Figure 17:
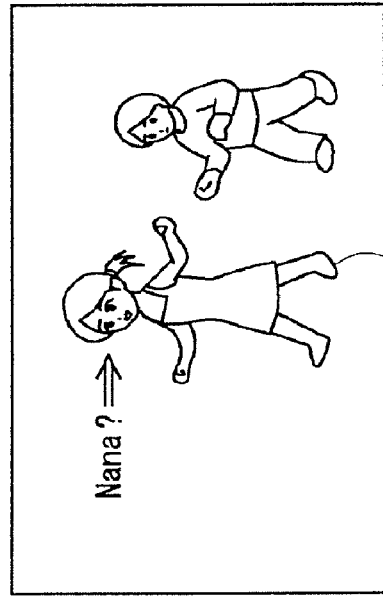
FIG. 17 shows an example of confirmation screens for persons by a confirmation information input section 1620.
Figure 17:
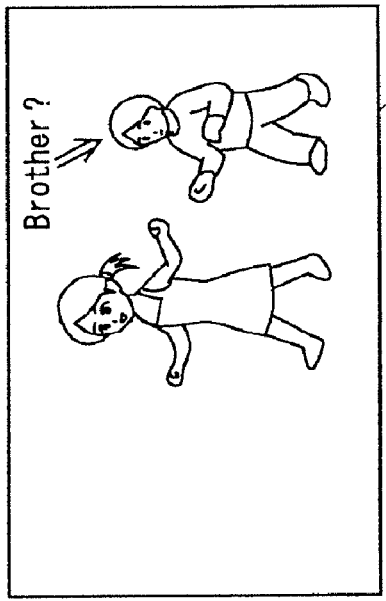

FIG. 17 shows an example of the confirmation screen for persons by the confirmation information input section 1620. Pre-images 1801 and 1802 represent an example of pre-images captured by the image capturing section 1602 at the timing at which the user 180 half-pushes the release bottom in order to register the personal identification information. Images 1811 and 1812 represent an example of the confirmation screen by the confirmation information input section 1620. Here, in the present embodiment, "Nana" and "Brother" as the personal identification information are inputted to the pre-images 1801 and 1802 by the personal identification information input section 1610, respectively.

The person extraction section 1614 extracts the person from a center region 1805 in the pre-image 1801. For example, the person extraction section 1614 extracts the image of the person from the region 1805 by pattern-matching the subject included in the central region 1805 with a predetermined pattern of person. Then, the person extraction section 1614 stores the extracted personal image. Additionally, the person notification section 1644 stores the personal identification information "Nana" inputted by the personal identification information section 1610.

When the user 180 instructs on image-capturing by a predetermined timing after half-pushing the release button, the person extraction section 1614 extracts the person from the captured image again. Then, the person position identification section 1642 retrieves an image matched with the image extracted from the pre-image 1801 with the coincidence higher than a predetermined coincidence and also with the highest coincidence. For example, a subject 1814 is retrieved in FIG. 17. Then, the person position identification section 1642 identifies the barycentric position of the subject person.

Then, the person notification section 1644 displays the image captured by the image capturing section 1602 on the monitor screen of the image capturing apparatus 1000 and also displays the inputted personal identification information "Nana" adjacent to the position of the person identified by the person position identification section 1642 to cause the user 180 to confirm whether the subject is the person identified by "Nana". Then, the confirmation information input section 1620 receives an input indicating whether the subject is the person identified by "Nana". For example, the confirmation information input section 1620 causes the user to input whether the subject is the person identified by "Nana" by pushing a confirmation button provided on the image capturing apparatus 100.

Then, when the personal identification information input section inputs that the subject is the person identified by "Nana", the image storage control section 1612 causes the image storage section 1604 to store the personal identification information "Nana" and the position identified by the person position identified section 1642 as the tag information of the captured image.

Here, the confirmation information input section 1620 may cause the user 180 to input the position of the person identified by the personal identification information "Nana" on the captured image displayed on the monitor screen by an input device such as a touch panel provided on the monitor screen. When the position of the person identified by the personal identification information "Nana" is inputted, the confirmation information input section 1620 may provide the inputted position to the image storage control section 1612 as confirmation information. Then, the image storage control section 1612 may cause the image storage section 1604 to store the provided position and the personal identification information "Nana" as the tag information of the captured image. Thus, the image capturing apparatus 100 can receive the correction of the position of the person.

In the same way, the position of the personal identification information "Brother" can be confirmed by the image captured after inputting the personal identification information "Brother" by extracting the person from a center region 1806 in a pre-image 1802. As described above, the image capturing apparatus 100 can certainly and effectively register information to identify a person included in the image and the position of the person by half-pushing the release button to input the person.

Here, the image capturing apparatus 100 may include the configuration having function and operation obtained by combining the functions and the operations of the image capturing apparatus 100 described with reference to FIG. 1-6 and the image capturing apparatus 100 with reference to FIG. 15-17. For example, even if personal identification information on the person is not inputted before image capturing, that can be registered after image-capturing by the function and the operation of the image capturing apparatus 100 described above with reference to FIG. 1-6.

The above-described album creating system 170 can easily record the subject person in an image captured by the image capturing apparatus 100 on the image. Then, the album creating apparatus 192 can receive the image from the image capturing apparatus 100 and automatically select the image on which the person closely related to the main character of the album is shown as the main subject to generate the album. Therefore, the user 180 can easily create the album in which the desired images are stored.

Figure 18:
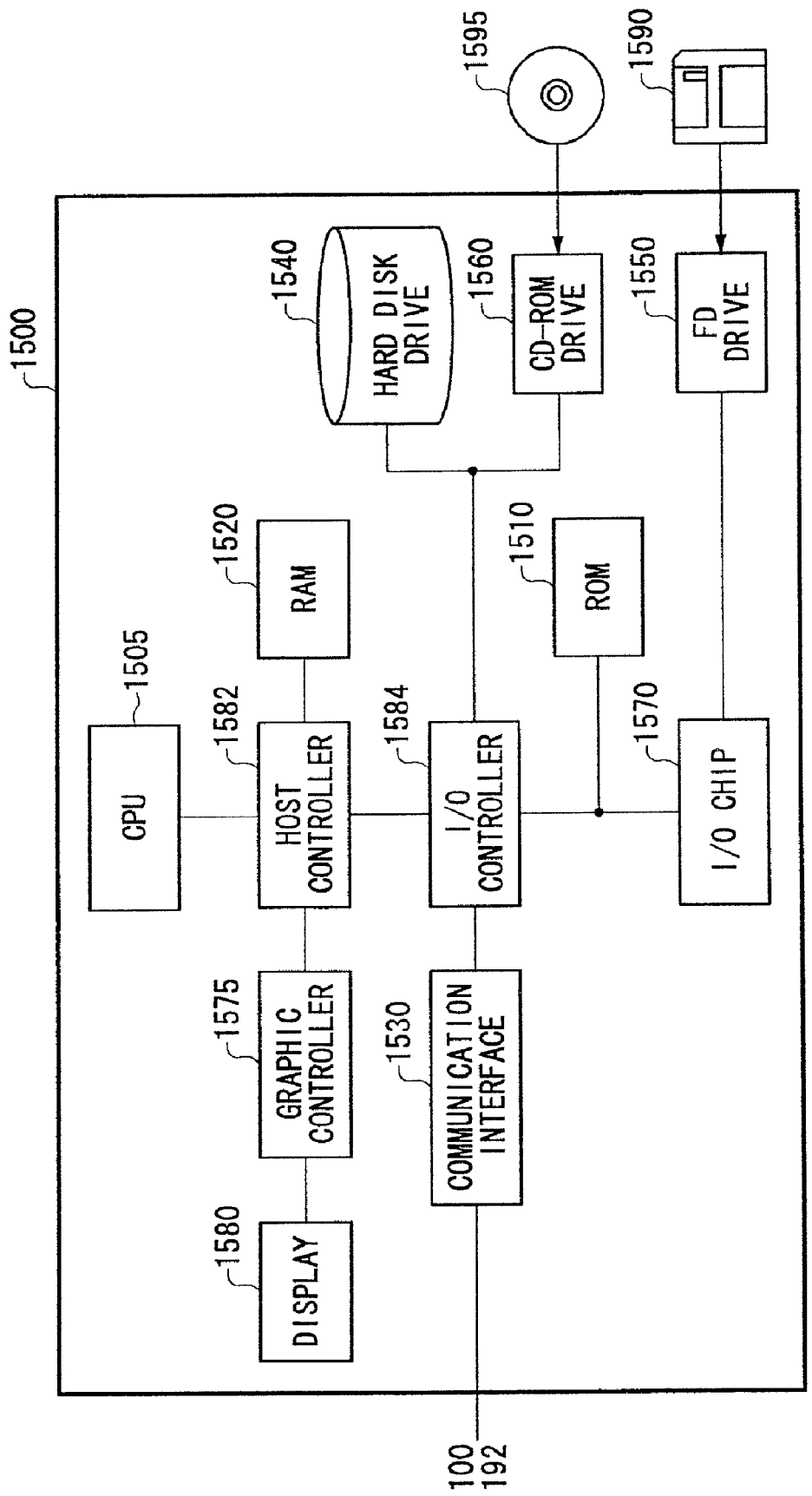
FIG. 18 shows an example of the hardware configuration of the image capturing apparatus 100 and the album creating apparatus 192.

FIG. 18 shows an example of the hardware configuration of a computer 1500 for the image capturing apparatus 100 and the album creating apparatus 192. The computer 1500 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The hard disk drive 1540 stores the program and data used by the CPU 1505 in the computer 1500. The communication interface 1530 communicates with the image capturing apparatus 100 or the album creating apparatus 192 through a network to provide the program and data to the image capturing apparatus 100 or the album creating apparatus 192. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the computer 1500 at activating and a program depending on the hardware of the computer 1500. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program provided to the communication interface 1530 through the RAM 1520 is stored in a recording medium, such as the flexible disk 1590, the CD-ROM 1595, or an IC card and provided by the user. The program is read from the recording medium, provided to the communication interface 1530 through the RAM 1520 and transmitted to the image capturing apparatus 100 or the album creating apparatus 192 through the network. The program transmitted to the image capturing apparatus 100 or the album creating apparatus 192 is installed therein and executed.

The program installed in the image capturing apparatus 100 and executed therein operates the image capturing apparatus 100 to function as the image capturing section 202, an image storage section 204, the person determining section 206, the input notification section 208, the personal identification information input section 210, the image storage control section 212, the personal image extraction section 214, the personal identification information retrieval section 218, a confirmation information input section 220 a retrieved person notification section 222, the related personal information storage section 224, the personal identification information selecting section 230, the person group recording section 232 and a person group selecting section 234, which are described with reference to FIG. 1-6. Additionally, the program operates the image capturing section 100 to function as the image capturing section 1602, the image storage section 1604, the person determining section 1606, the personal identification information input section 1610, the image storage control section 1612, the person extraction section 1614, the confirmation information input section 1620, the number of person calculating section 1640, the person position identification section 1642 and the person notification section 1644, which are described above with reference to FIG. 15-FIG. 17. Further, the program installed in the album creating apparatus 192 and executed therein operates the album creating apparatus 192 to function as the image storage section 604, the related personal information storage section 624, the image selecting section 632, the relate personal information extraction section 634, the designated personal image extraction section 660, the specified subject information acquiring section 662 and the album creating section 636 described above with reference to FIG. 1 and FIG. 7-14. Further, the program operates the album creating section 636 to function as the area calculating section 672, the image classification section 670, the person determining section 674, the trimming image generating section 676 and the album generating section 680.

The above-described programs may be stored in an external storage medium. The external recording medium may be an optical storage medium such as a DVD and a PD, a magneto-optical recording medium such as a MD, a tape medium and a semiconductor memory such as an IC card. A storage medium such as a hard disk or a RAM which is provided in the server system connected to a private communication network or Internet is used as the recording medium to provide the program to the computer 1500 through the network.

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

The invention claimed is:

1. An album creating apparatus comprising:
    an image storage section for storing personal identification information indicative of a person included in an image in association with the image;
    a related personal information storage section for storing related personal information associated with the personal identification information on the persons closely related to each other;
    a related personal information extraction section for extracting the personal identification information on a person closely related to a designated person who is designated by a user based on the related personal information stored in the related personal information storage section;
    an image selecting section for selecting the image stored in the image storage section in association with the personal identification information extracted by the related personal information extraction section;
    an album creating section for creating an album including the image selected by the image selecting section; and
    a designated personal image extraction section for extracting an designated personal image stored in the image storage section in association with personal identification information indicative of the designated person,
    wherein the album creating section includes an image classification section for classifying the related personal image selected by the image selecting section and the designated personal image extracted by the designated personal image extraction section.

2. The album creating apparatus according to claim 1, wherein the album creating section includes an album generating section for generating each page of the album using images classified into each page in the album by the image classification section,
    wherein the image classification section for classifying a related personal image selected by the image selecting section and a designated personal image extracted by the designated personal image extraction section into different pages in an album.

3. The album creating apparatus according to claim 1 wherein, the related personal information extraction section extracts personal identification information on a first person and a second person closely related to the designated person based on the related personal information stored in the related personal information storage section, the image selecting section selects a first related personal image stored in the image storage section in association with the personal identification information indicative of the first person and a second related personal image stored in the image storage section in association with the personal identification information indicative of the second person, which are extracted by the related personal information extraction section, the album creating section including
    an album generating section for generating each page in the album using the images classified into each page by the image classification section,
    wherein: the image classification section for classifying the first related personal image selected by the image selecting section and the designated personal image extracted by the designated personal image extraction section into one page in the album, and also classifies the second related personal image selected by the image selecting section and the designated personal image extracted by the designated personal image extraction section into the other page in the album.

4. The album creating apparatus according to claim 1 wherein, the related personal information extraction section extracts personal identification information on a first person and a second person closely related to the designated person based on the related personal information stored in the related personal information storage section, the image selecting section selects a first related personal image stored in the image storage section in association with the personal identification information indicative of the first person and a second related personal image stored in the image storage section in association with the personal identification information indicative of the second person, which are extracted by the related personal information extraction section, the album creating section including
    an album generating section for generating one page in the album using the designated personal image, the first related personal image and the second related personal image which are classified into the one page in the album by the image classification section
    wherein the image classification section for classifying the designated personal image extracted by the designated personal image extraction section, and the first related personal image and the second related personal image selected by the image selecting section into one page in the album.

5. The album creating apparatus according to claim 4, wherein the image classification section classifies the first related personal image and the second related personal image into each page such that the number of first person and the number of second person included in one page is approximately equal based on the related personal information stored in the related personal information storage section.

6. The album creating apparatus according to claim 4, wherein the album creating section further includes an area calculating section for calculating an area for a first person and a second person included in the image stored in the image storage section based on the related personal information stored in the related personal information storage section, and wherein the image classification section classifies the first related personal image and the second related personal image into each page such that the area for the first person and the area for the second person are substantially equal in one page based on the related personal information stored in the related personal information storage section and the area calculated by the area calculating section.

7. The album creating apparatus according to claim 4, wherein the album creating section further includes an area calculating section for calculating for each page an area for a first person and a second person included in the first related personal image and the second related personal image classified into each page by the image classification section based on the related personal information stored in the related personal information storage section, and wherein the image generating section enlarges or reduces the first personal image and the second personal image to generate the album such that the area for the first person and the area for the second person calculated by the area calculating section are substantially equal in one page.

8. An album creating method comprising:
storing personal identification information indicative of a person included in an image in association with the image;
storing related personal information associated with the personal identification information on persons closely related to each other;
extracting the personal identification information on a person closely related to a designated person who is designated by a user based on the related personal identification information stored in the related personal information storing step;
extracting a related personal image stored in the image storing step in association with the personal identification information extracted in the related personal information extracting step;
extracting a designated personal image stored in the image storage section in association with personal identification information indicative of the designated person; and
generating an album including the image extracted in the image extracting step,
wherein the album generating step includes classifying the related personal image extructed by the related personal image extracting step and the designated personal image extracted by the designated personal image extracting step.

9. A non-transitory computer readable storage medium having encoded thereon a computer program comprising a set of instructions when executed by a computer to implement a method for an album creating apparatus for creating an album, the method operates the album creating apparatus to function as:
an image storage section for storing personal identification information indicative of a person included in an image in association with the image;
a related personal information storage section for storing related personal information associated with the personal identification information on the persons closely related to each other;
a related personal information extraction section for extracting the personal identification information on a person closely related to a designated person who is designated by a user based on the related personal information stored in the related personal information storage section;
an image selecting section for selecting the image stored in the image storage section in association with the personal identification information extracted by the related personal information extraction section;
an album creating section for creating an album including the image selected by the image selecting section; and
a designated personal image extraction section for extracting a designated personal image stored in the image storage section in association with personal identification information indicative of the designated person,
wherein the album creating section includes an image classification section for classifying the related personal image selected by the image selecting section and the designated personal image extracted by the designated personal image extraction section.

10. An album creating system comprising:
an image capturing section for capturing an image;
a person determining section for determining whether the image captured by the image capturing section includes any person;
an input notification section for notifying a user that the person included in the image captured by the image capturing section should be inputted when the person determining section determines that the image includes any person;
a personal identification information input section for causing the user to input personal identification information indicative of the person included in the image captured by the image capturing section by a predetermined timing after the input notification section notifies the user that the person included in the image captured by the image capturing section should be inputted;
an image storage section for storing the personal identification information inputted by the personal identification information input section in association with the image captured by the image capturing section when the personal identification information input section inputs the personal identification information;
a related personal information storage section for storing related personal information associated with the personal identification information on the persons closely related to each other;
a related personal information extraction section for extracting the personal identification information on a person closely related to a designated person who is designated by the user based on the related personal information stored in the related personal information storage section;
an image selecting section for selecting the image stored in the image storage section in association with the personal identification information extracted by the related personal information extraction section; and
an album generating section for generating an album including the image selected by the image selecting section,
wherein the album creating section includes:
a person determination section for determining whether one image selected by the image selecting section includes at least the person closely related to the designated person; and
a trimming image generating section for generating a trimming image which includes at least the person closely related to the designated person and in which the person more closely related to the designated person are enhanced.

11. An album creating apparatus comprising:
an image storage section for storing personal identification information indicative of a person included in an image in association with the image;
a related personal information storage section for storing related personal information associated with the personal identification information on the persons closely related to each other;
a related personal information extraction section for extracting the personal identification information on a person closely related to a designated person who is designated by a user based on the related personal information stored in the related personal information storage section;
an image selecting section for selecting the image stored in the image storage section in association with the personal identification information extracted by the related personal information extraction section; and an album creating section for creating an album including the image selected by the image selecting section,
wherein the album creating section includes:
a person determination section for determining whether one image selected by the image selecting section includes at least the person closely related to the designated person; and
a trimming image generating section for generating a trimming image which includes at least the person closely related to the designated person and in which the person more closely related to the designated person are enhanced.

12. The album creating apparatus according to claim 11, wherein the album creating section includes:
an album generating section for generating an album using the trimming image generated by the trimming image generating section,
the person determination section determines whether one image selected by the image selecting section includes both of the designated person and the person closely related to the designated person,
the trimming image generating section generates a trimming image which includes the designated person and the person closely related to the designated person and in which the designated person is distinctly trimmed from the image when the person determining section determines that the one image selected by the image selecting section includes both of the designated person and the person closely related to the designated person.

13. The album creating apparatus according to claim 11, wherein the related personal information storage section stores related personal information associated with the personal identification information on the persons closely related to each other in association with degree of relationship between the closely related persons, the album creating section including
an album generating section for generating an album using the trimming image generated by the trimming image generating section,
wherein the person determining section determines whether one image selected by the image selecting section includes both of a first person and a second person who is less closely related to the designated person than the first person;
the trimming image generating section generates a trimming image which includes the first person and a second person and in which the first person is enhanced more than the second person, when the person determining section determines that the one image selected by the image selecting section includes both of the first person and the second person.

14. An album creating method comprising:
storing personal identification information indicative of a person included in an image in association with the image;
storing related personal information associated with the personal identification information on persons closely related to each other;
extracting the personal identification information on a person closely related to a designated person who is designated by a user based on the related personal identification information stored in the related personal information storing step;
extracting the image stored in the image storing step in association with the personal identification information extracted in the related personal information extracting step; and
generating an album including the image extracted in the image extracting step,
wherein the album generating step includes:
determining whether one image selected by the image selecting section includes at least the person closely related to the designated person; and
generating a trimming image which includes at least the person closely related to the designated person and in which the person more closely related to the designated person are enhanced.

15. A non-transitory computer readable storage medium having encoded thereon a computer program comprising a set of instructions when executed by a computer to implement a method for an album creating apparatus for creating an album, the method operates the album creating apparatus to function as:
an image storage section for storing personal identification information indicative of a person included in an image in association with the image;
a related personal information storage section for storing related personal information associated with the personal identification information on the persons closely related to each other;
a related personal information extraction section for extracting the personal identification information on a person closely related to a designated person who is designated by a user based on the related personal information stored in the related personal information storage section;
an image selecting section for selecting the image stored in the image storage section in association with the personal identification information extracted by the related personal information extraction section; and
an album creating section for creating an album including the image selected by the image selecting section,
wherein the album creating section includes:
a person determination section for determining whether one image selected by the image selecting section includes at least the person closely related to the designated person; and
a trimming image generating section for generating a trimming image which includes at least the person closely related to the designated person and in which the person more closely related to the designated person are enhanced.

16. An album creating system comprising:
an image capturing section for capturing an image;
a person determining section for determining whether the image captured by the image capturing section includes any person;
an input notification section for notifying a user that the person included in the image captured by the image capturing section should be inputted when the person determining section determines that the image includes any person;
a personal identification information input section for causing the user to input personal identification information indicative of the person included in the image captured by the image capturing section by a predetermined timing after the input notification section notifies the user that the person included in the image captured by the image capturing section should be inputted;
an image storage section for storing the personal identification information inputted by the personal identification information input section in association with the image captured by the image capturing section when the personal identification information input section inputs the personal identification information;
a related personal information storage section for storing related personal information associated with the personal identification information on the persons closely related to each other;
a related personal information extraction section for extracting the personal identification information on a person closely related to a designated person who is designated by the user based on the related personal information stored in the related personal information storage section;
an image selecting section for selecting the image stored in the image storage section in association with the personal identification information extracted by the related personal information extraction section; and
an album generating section for generating an album including the image selected by the image selecting section, wherein the album generating section includes:
a person determination section for determining whether one image selected by the image selecting section includes at least the person closely related to the designated person; and
a trimming image generating section for generating a trimming image which includes at least the person closely related to the designated person and in which the person more closely related to the designated person are enhanced.

* * * * *